(12) United States Patent
Molesworth

(10) Patent No.: US 11,287,011 B2
(45) Date of Patent: Mar. 29, 2022

(54) HYDRAULIC MOUNT

(71) Applicant: VIBRACOUSTIC USA, INC., South Haven, MI (US)

(72) Inventor: Steven C. Molesworth, South Haven, MI (US)

(73) Assignee: Vibracoustic USA, Inc., South Haven, MI (US)

( * ) Notice: Subject to any disclaimer, the term of this patent is extended or adjusted under 35 U.S.C. 154(b) by 0 days.

(21) Appl. No.: 17/274,931

(22) PCT Filed: Sep. 19, 2019

(86) PCT No.: PCT/US2019/051954
§ 371 (c)(1),
(2) Date: Mar. 10, 2021

(87) PCT Pub. No.: WO2020/061329
PCT Pub. Date: Mar. 26, 2020

(65) Prior Publication Data
US 2021/0317895 A1    Oct. 14, 2021

Related U.S. Application Data

(60) Provisional application No. 62/733,235, filed on Sep. 19, 2018.

(51) Int. Cl.
*F16F 13/10*    (2006.01)
*B60K 5/12*    (2006.01)

(52) U.S. Cl.
CPC .......... *F16F 13/107* (2013.01); *F16F 13/103* (2013.01); *F16F 13/108* (2013.01);
(Continued)

(58) Field of Classification Search
CPC ...... F16F 13/107; F16F 13/103; F16F 13/108; F16F 2222/12; F16F 2224/025; F16F 2230/0005; B60K 5/1225
See application file for complete search history.

(56) References Cited

U.S. PATENT DOCUMENTS 4,936,556 A * 6/1990 Makibayashi .......... F16F 13/16
267/140.13
5,040,775 A * 8/1991 Miyakawa .......... B60G 13/003
267/220

(Continued)

OTHER PUBLICATIONS

International Search Reported dated Dec. 3, 2019 for copending International Application No. PCT/US19/51954.

*Primary Examiner* — Robert A. Siconolfi
*Assistant Examiner* — James K Hsiao
(74) *Attorney, Agent, or Firm* — Fishman Stewart PLLC

(57) ABSTRACT

A hydraulic mount includes a core, a first elastomeric member, a second elastomeric member connected to the first elastomeric member, a third elastomeric member connected to the core, a housing including a first housing member connected to the first elastomeric member and a second housing member connected to the second elastomeric member, a first ring, and a second ring connecting the first ring with the third elastomeric member. The first elastomeric member, the second elastomeric member, the third elastomeric member, the first ring, and the second ring may cooperate to provide a first fluid chamber and a second fluid chamber, fluid path connects the first fluid chamber to the second fluid chamber.

16 Claims, 26 Drawing Sheets

(52) U.S. Cl.
CPC ......... *B60K 5/1225* (2013.01); *F16F 2222/12* (2013.01); *F16F 2224/025* (2013.01); *F16F 2230/0005* (2013.01)

(56) References Cited

U.S. PATENT DOCUMENTS

| | | | | |
|---|---|---|---|---|
| 5,690,320 | A * | 11/1997 | Kanda | F16F 13/16 267/140.12 |
| 6,981,696 | B2 * | 1/2006 | Hatano | F16F 13/16 267/140.12 |
| 7,584,944 | B2 * | 9/2009 | Goudie | F16F 13/1418 267/140.12 |
| 7,922,156 | B2 * | 4/2011 | Goudie | F16F 13/1418 267/140.12 |
| 8,091,871 | B2 * | 1/2012 | Bradshaw | F16F 13/16 267/140.13 |
| 9,163,695 | B2 * | 10/2015 | Saito | F16F 13/1463 |
| 9,765,845 | B2 * | 9/2017 | Bradshaw | B60K 5/1208 |
| 10,088,009 | B2 * | 10/2018 | Nydam | B62D 24/02 |
| 10,150,510 | B2 * | 12/2018 | Baluch | B62D 24/04 |
| 2002/0175456 | A1 * | 11/2002 | Itoh | F16F 13/16 267/140.11 |
| 2004/0004317 | A1 | 1/2004 | Hatano et al. | |
| 2006/0261531 | A1 * | 11/2006 | Kim | F16F 13/16 267/140.12 |
| 2011/0057366 | A1 | 3/2011 | Bradshaw et al. | |
| 2013/0033054 | A1 * | 2/2013 | Wittmershaus | F16F 13/24 296/1.03 |
| 2013/0038006 | A1 * | 2/2013 | Saito | F16F 13/107 267/140.13 |
| 2013/0069288 | A1 * | 3/2013 | Saito | F16F 13/1481 267/140.13 |
| 2014/0001685 | A1 * | 1/2014 | Kim | F16F 13/107 267/140.13 |
| 2014/0327198 | A1 * | 11/2014 | Preikszas | F16F 13/107 267/140.13 |
| 2016/0003322 | A1 * | 1/2016 | Bradshaw | F16F 13/10 267/140.13 |
| 2018/0066726 | A1 * | 3/2018 | Parr | F16F 13/10 |
| 2018/0135722 | A1 * | 5/2018 | Oniwa | F16F 13/1409 |

* cited by examiner

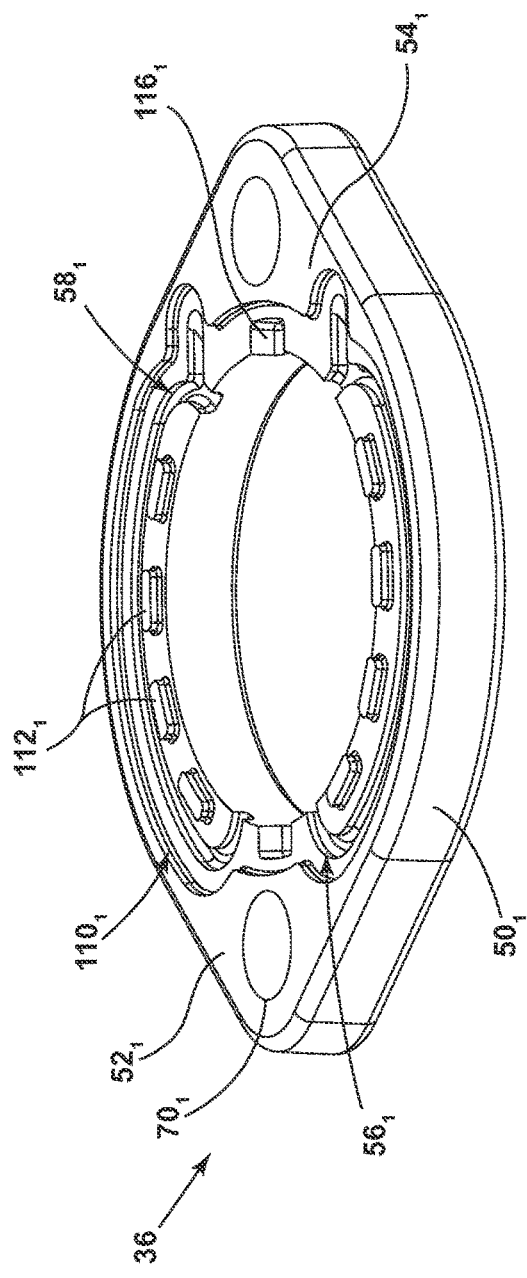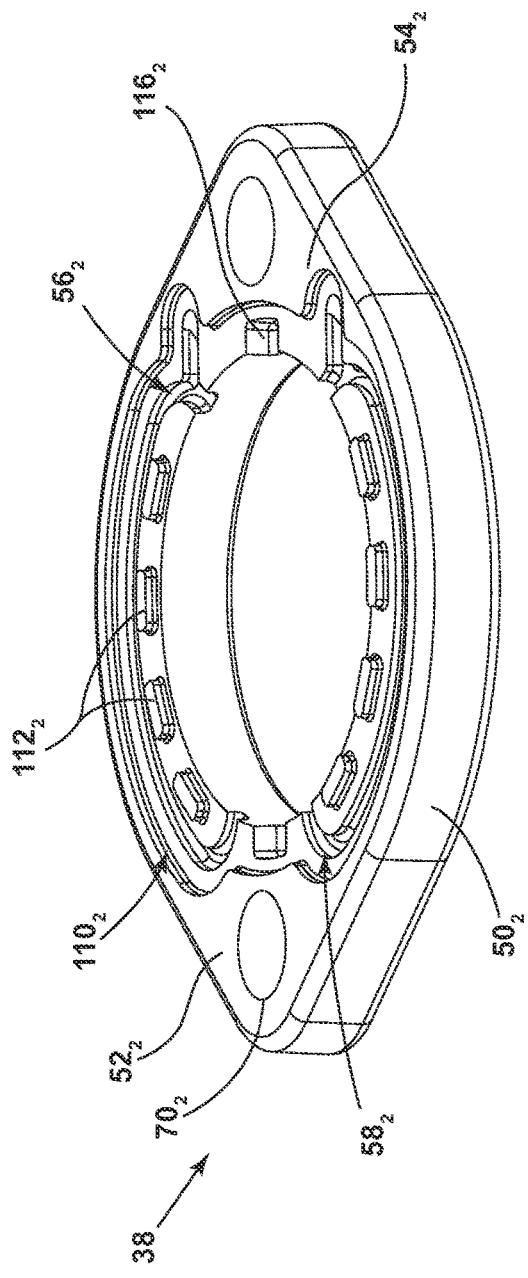
FIG. 2A
FIG. 2B

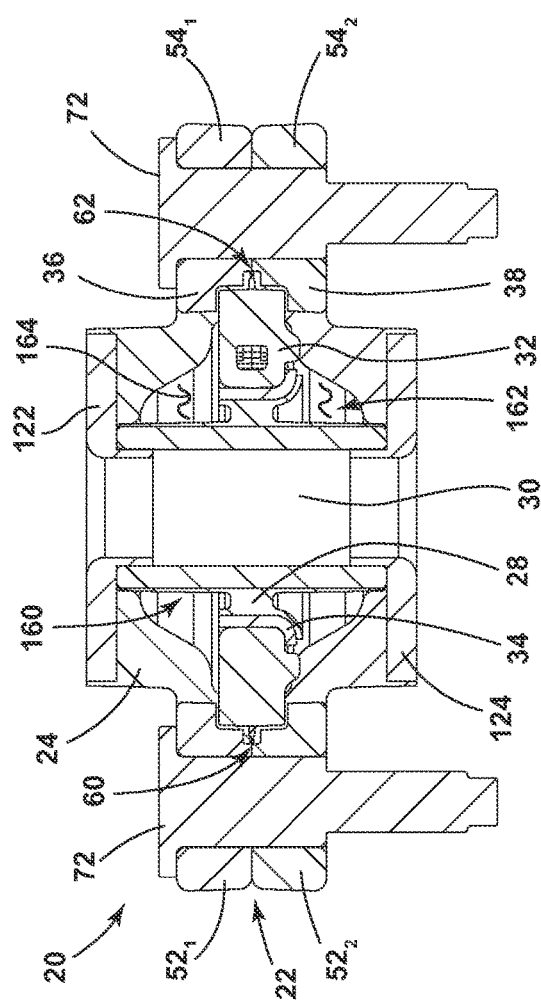
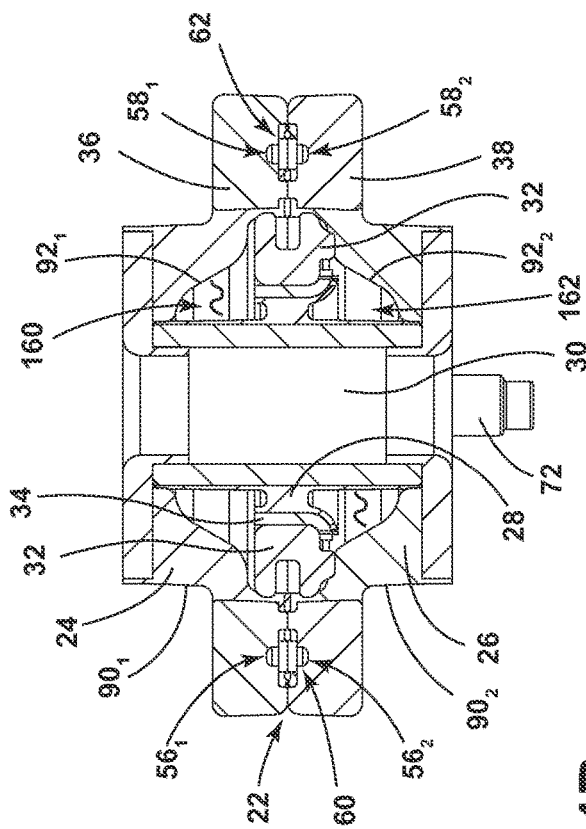
FIG. 4A
FIG. 4B

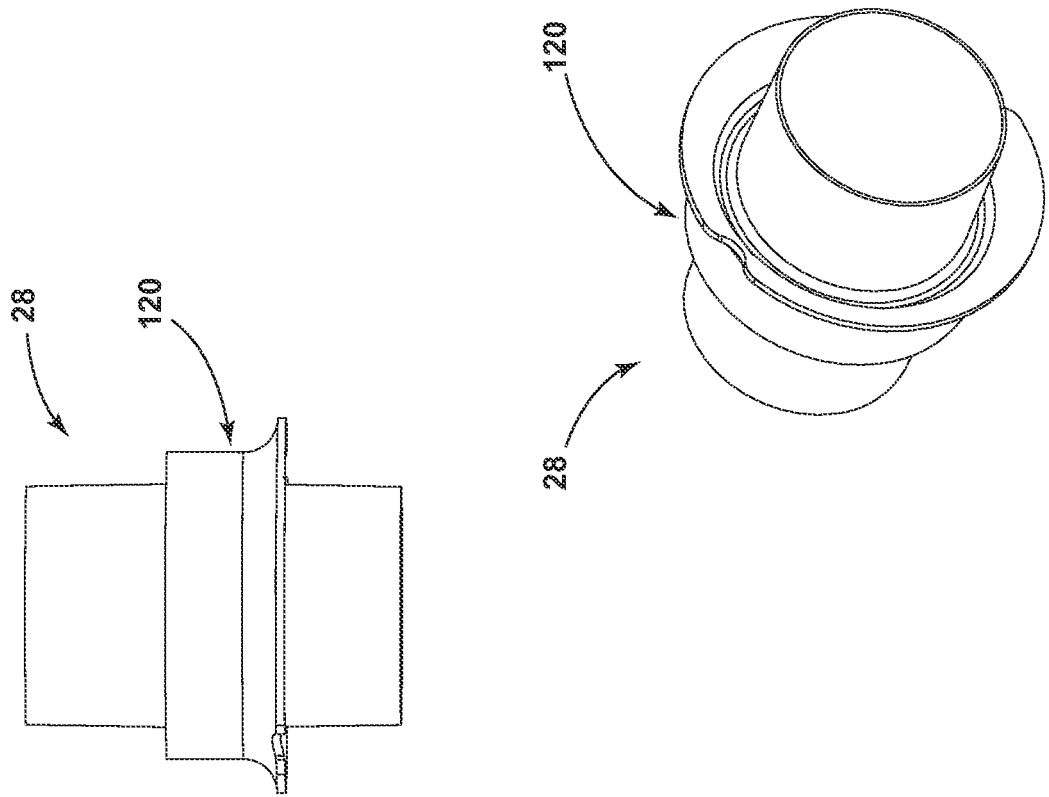
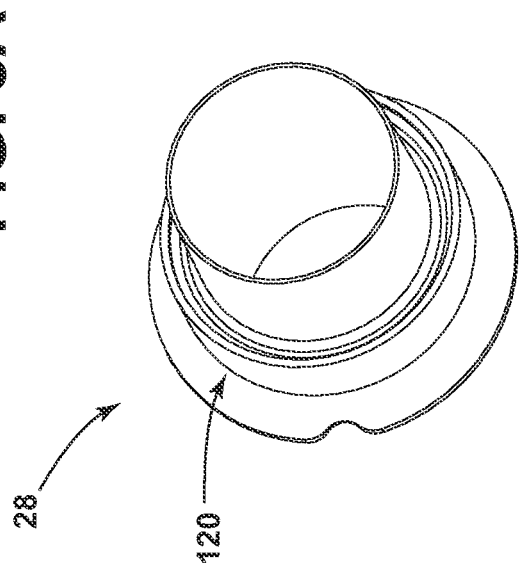
FIG. 8A
FIG. 8B
FIG. 8C

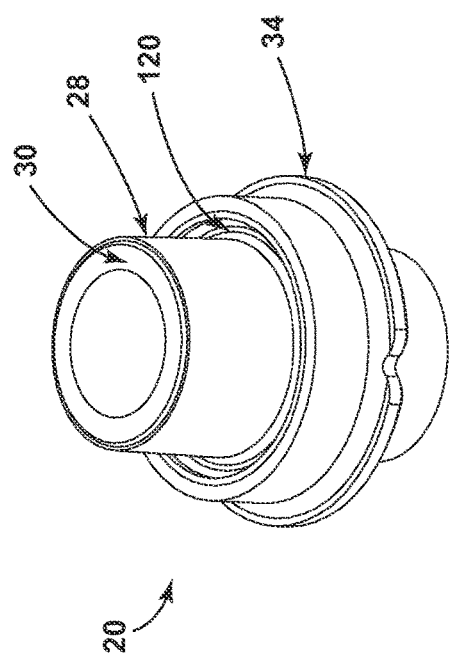
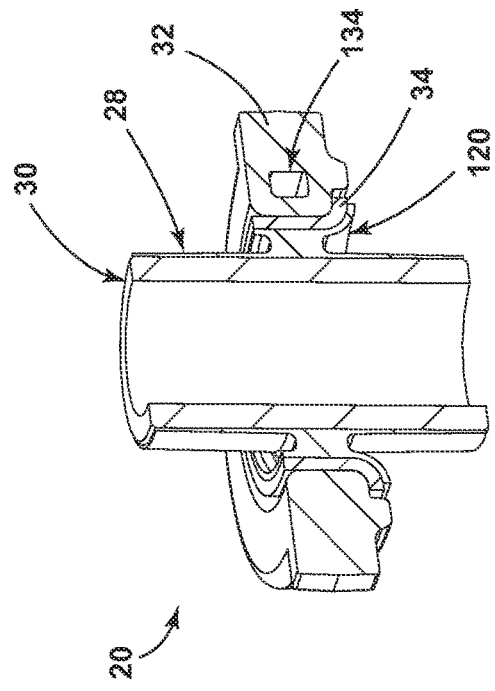
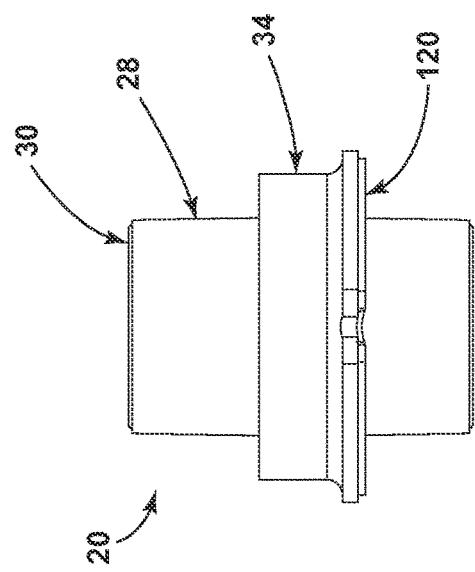
FIG. 9A
FIG. 9B
FIG. 9C

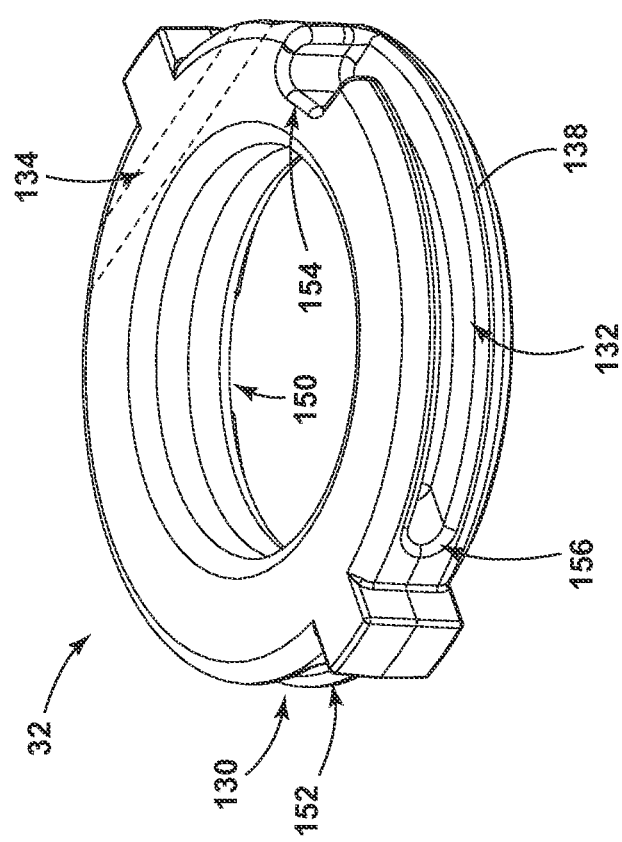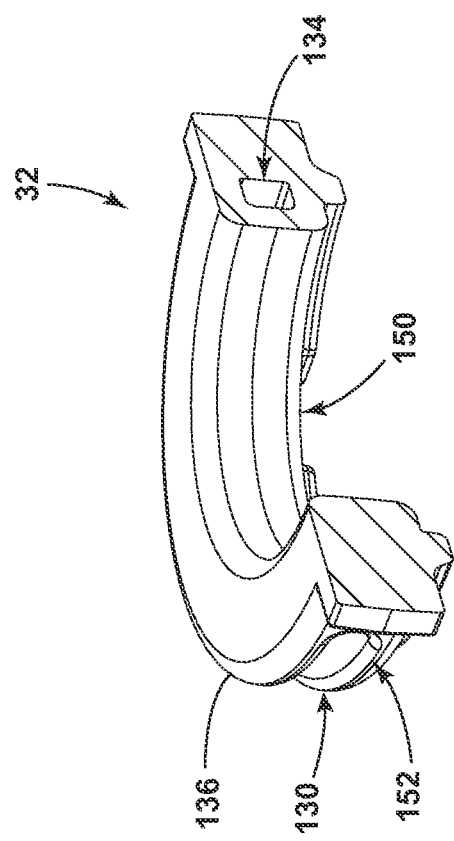

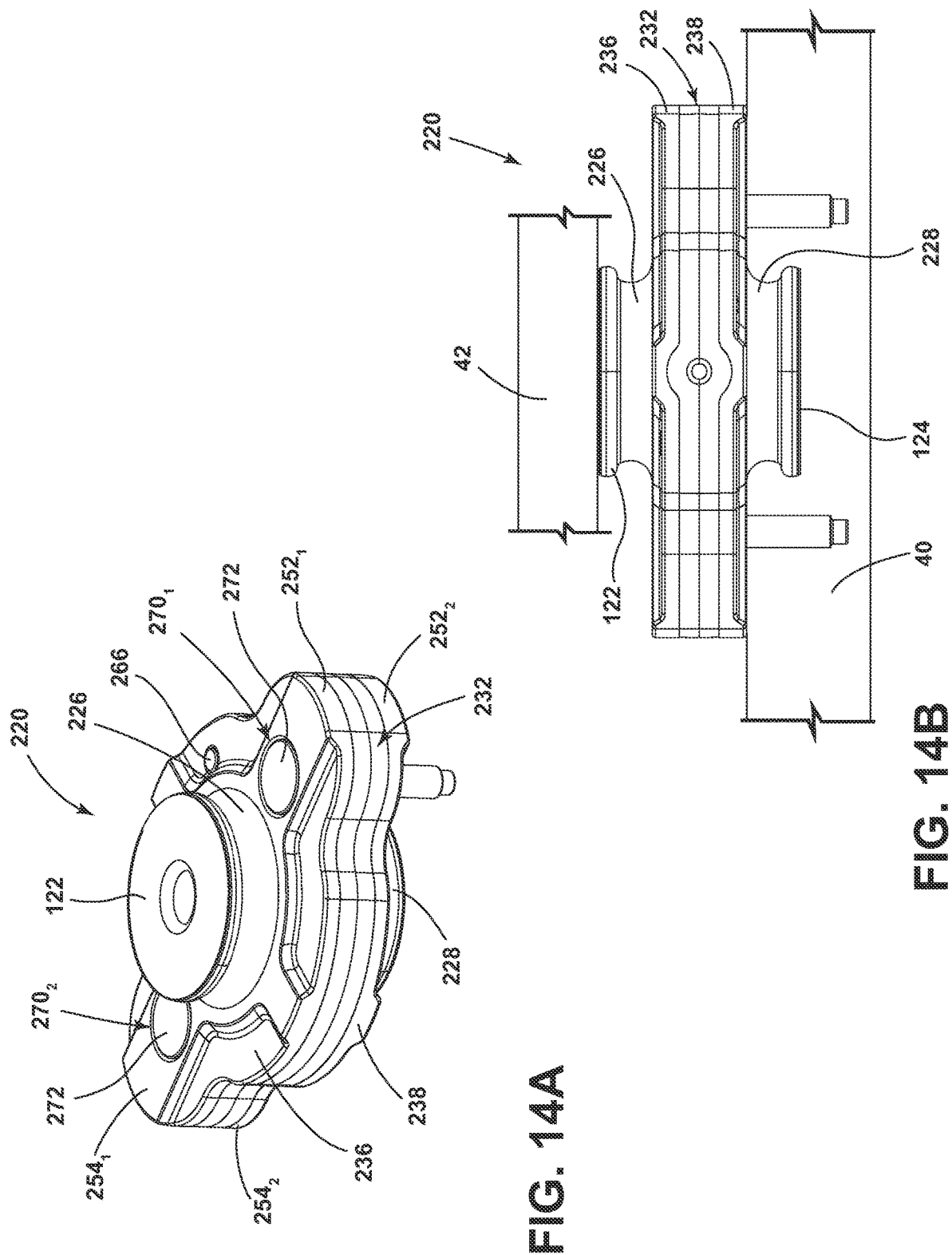

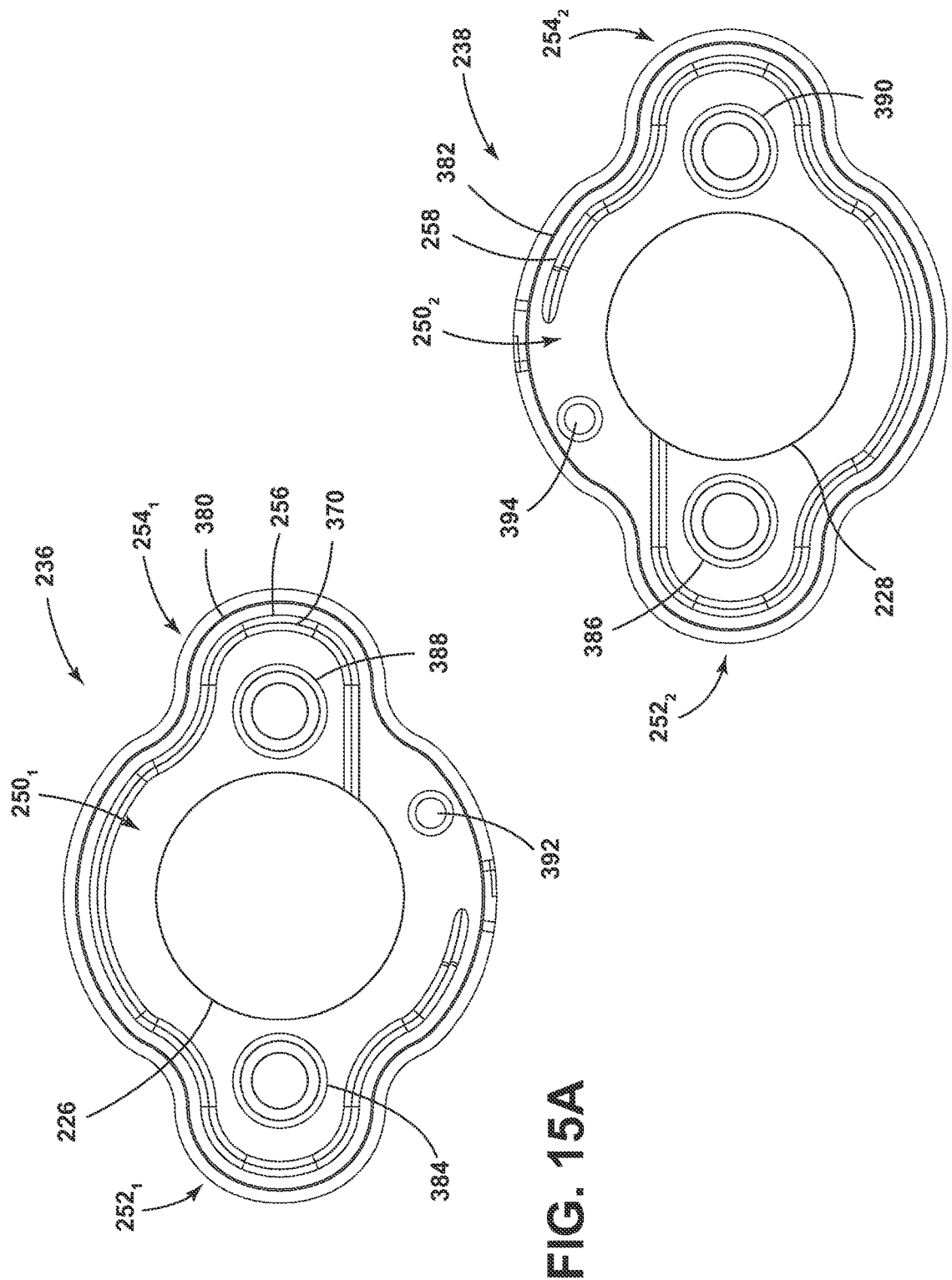

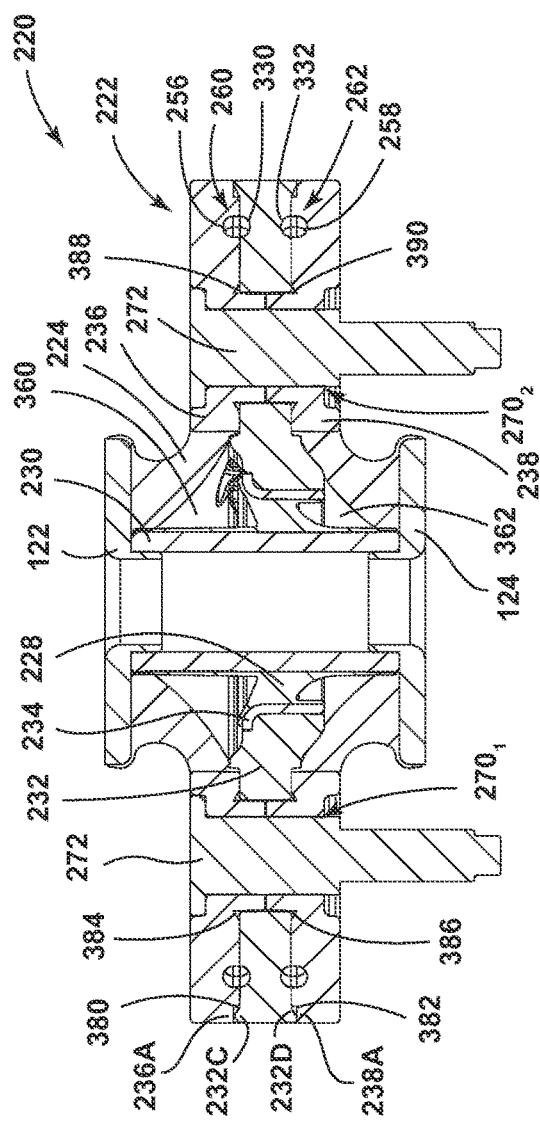
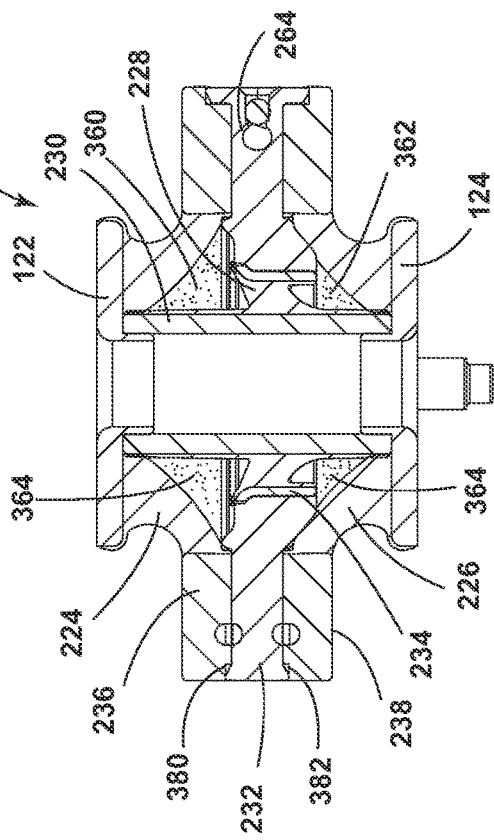
FIG. 16A
FIG. 16B

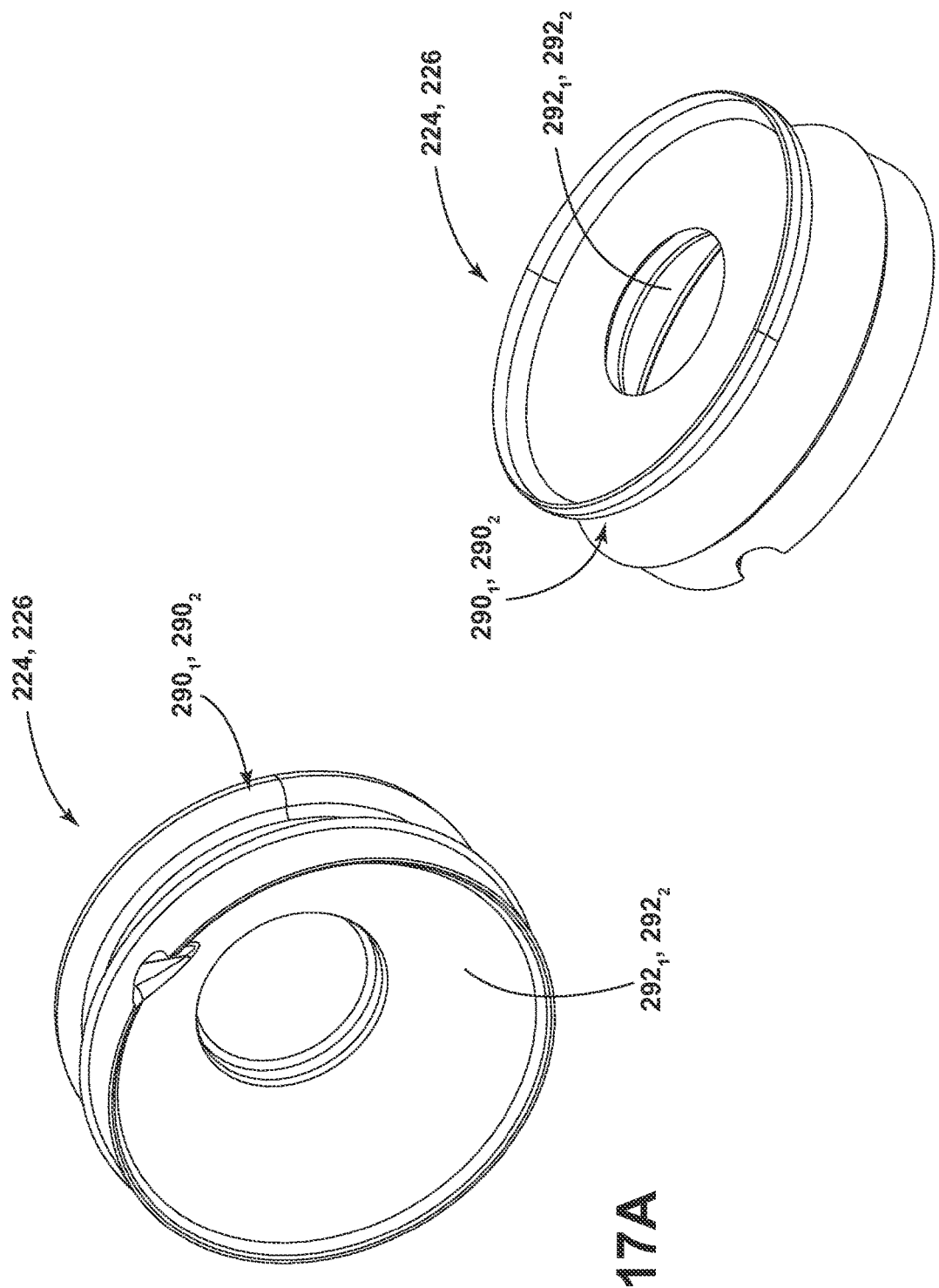

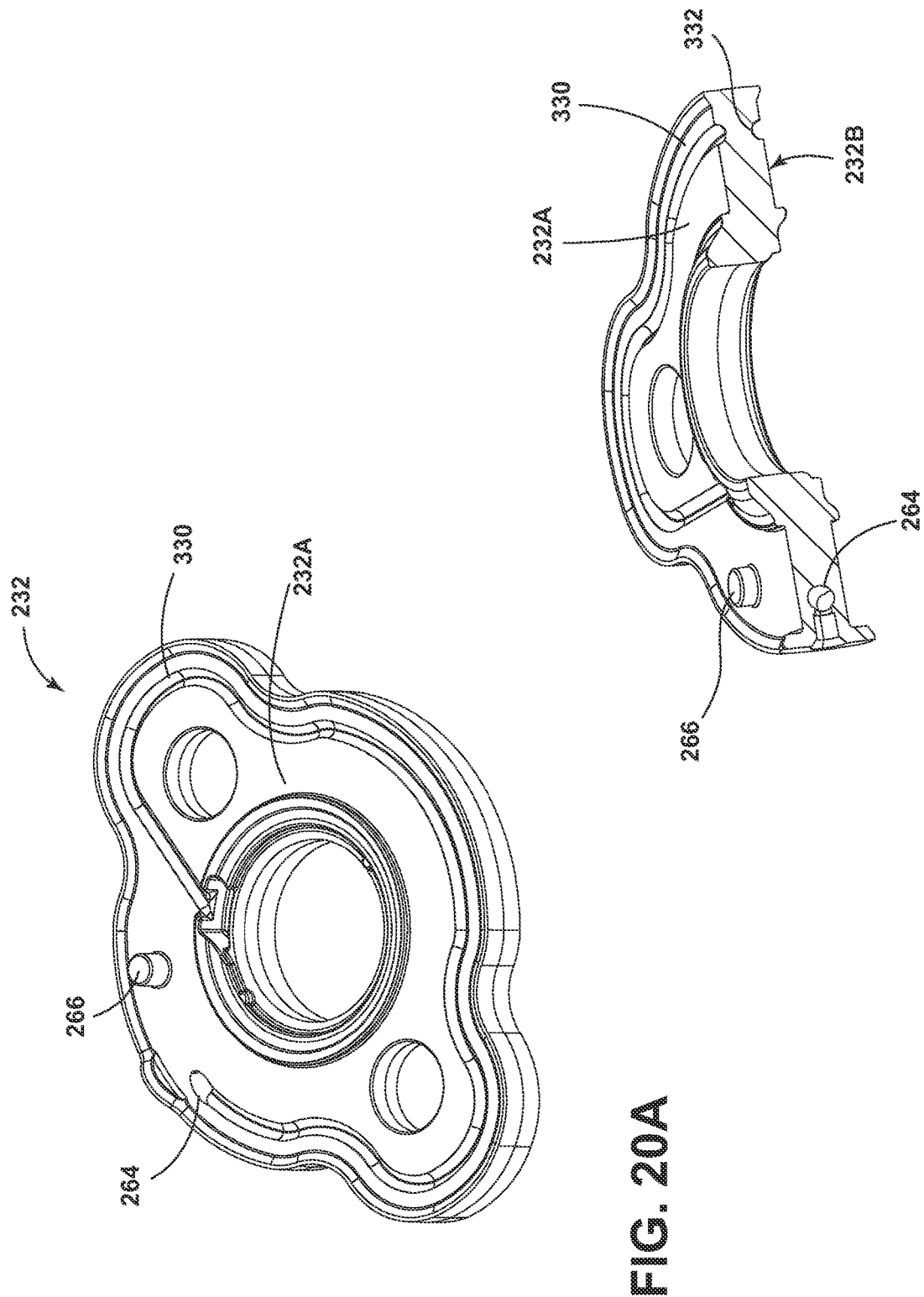

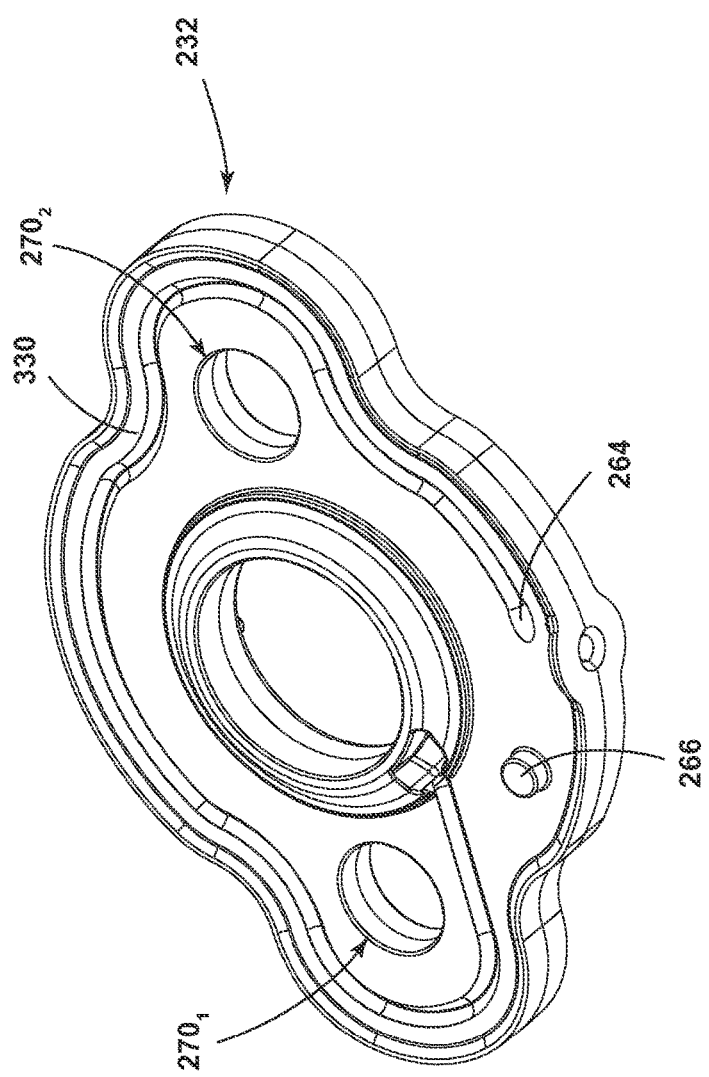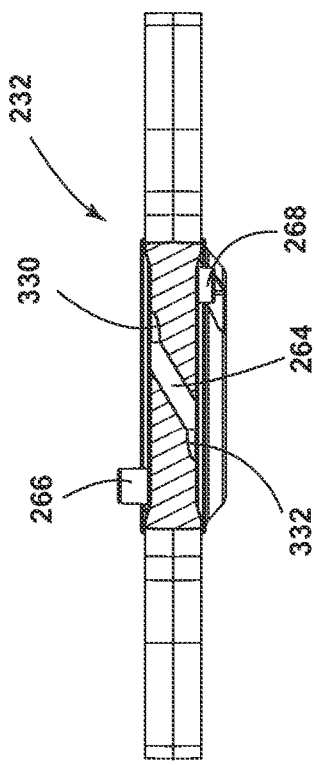
FIG. 20C
FIG. 20D

HYDRAULIC MOUNT

CROSS-REFERENCE TO RELATED APPLICATION

This application is a National Stage patent application of International Patent Application No. PCT/US2019/51954, filed Sep. 19, 2019. This application claims the benefit of U.S. Provisional Patent Application Ser. No. 62/733,235, filed on Sep. 19, 2018, the disclosure of which is hereby incorporated by reference in its entirety as though fully set forth herein.

TECHNICAL FIELD

The present disclosure generally relates to hydraulic mounts, including hydraulic mounts that may, for example, be used in connection with vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some mount designs may be heavy, large, complicated, difficult to assemble, and/or inefficient.

There is a desire for solutions/options that minimize or eliminate one or more challenges or shortcomings of hydraulic mounts. The foregoing discussion is intended only to illustrate examples of the present field and is not a disavowal of scope.

SUMMARY

In embodiments, a hydraulic mount may include a core, a first elastomeric member, a second elastomeric member connected to the first elastomeric member, a third elastomeric member connected to the core, a housing including a first housing member connected to the first elastomeric member and a second housing member connected to the second elastomeric member, a first ring, and/or a second ring connecting the first ring with the third elastomeric member. The first elastomeric member, the second elastomeric member, the third elastomeric member, the first ring, and/or the second ring may cooperate to provide a first fluid chamber and a second fluid chamber. A fluid path may connect the first fluid chamber to the second fluid chamber.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

FIGS. 2A and 2B are perspective views generally illustrating embodiments of housing members according to teachings of the present disclosure.

FIGS. 4A and 4B are cross-sectional views generally illustrating embodiments of hydraulic mounts according to teachings of the present disclosure.

FIG. 8A is a side view generally illustrating portions of an embodiment of a third elastomeric member according to teachings of the present disclosure.

FIGS. 8B and 8C are perspective views generally illustrating embodiments of third elastomeric members according to teachings of the present disclosure.

FIG. 9A is a perspective view generally illustrating portions of an embodiment of a hydraulic mount according to teachings of the present disclosure.

FIG. 9B is a side view generally illustrating portions of an embodiment of a hydraulic mount according to teachings of the present disclosure.

FIG. 9C is a cross-sectional perspective view generally illustrating portions of an embodiment of a hydraulic mount according to teachings of the present disclosure.

FIG. 10A is a perspective view generally illustrating portions of an embodiment of a first ring according to teachings of the present disclosure.

FIG. 10B is a cross-sectional perspective view generally illustrating portions of an embodiment of a first ring according to teachings of the present disclosure.

FIGS. 14A and 14B are a perspective view and a side view, respectively, generally illustrating embodiments of hydraulic mounts according to teachings of the present disclosure.

FIGS. 15A and 15B are top and bottom views generally illustrating an embodiment of a housing member according to teachings of the present disclosure.

FIGS. 16A and 16B are cross-sectional views generally illustrating embodiments of hydraulic mounts according to teachings of the present disclosure.

FIGS. 17A and 17B are perspective views generally illustrating embodiments of elastomeric members according to teachings of the present disclosure.

FIGS. 20A and 20B are a perspective view and a cross-sectional perspective view, respectively, generally illustrating embodiments of first rings according to teachings of the present disclosure.

FIG. 20C is a perspective view generally illustrating an embodiment of a first ring according to teachings of the present disclosure.

FIG. 20D is a cross-sectional perspective view generally illustrating portions of an embodiment of a first ring according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Figure 1:
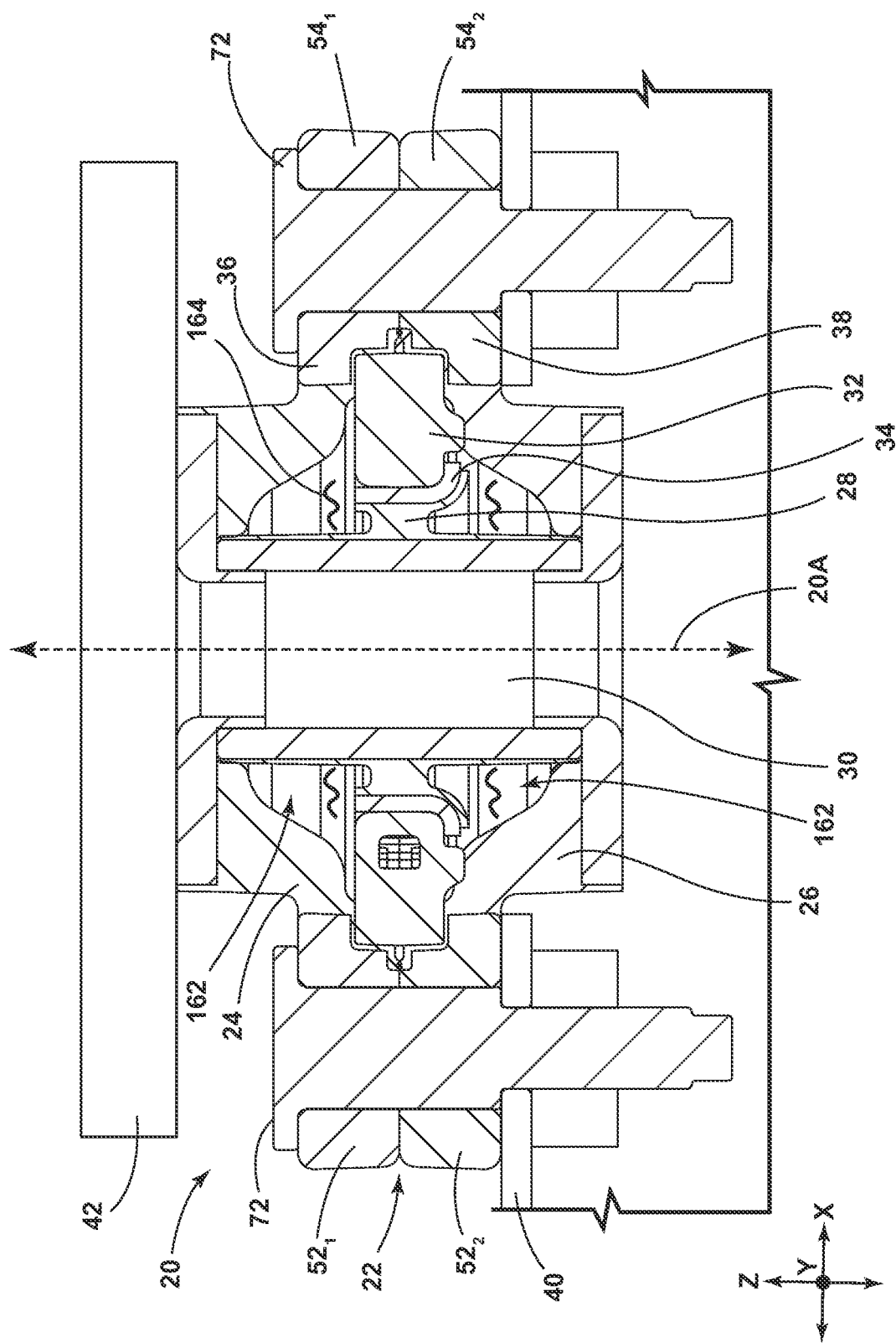
FIG. 1 is a cross-sectional view generally illustrating portions of an embodiment of a hydraulic mount according to teachings of the present disclosure.
Figure 3A:
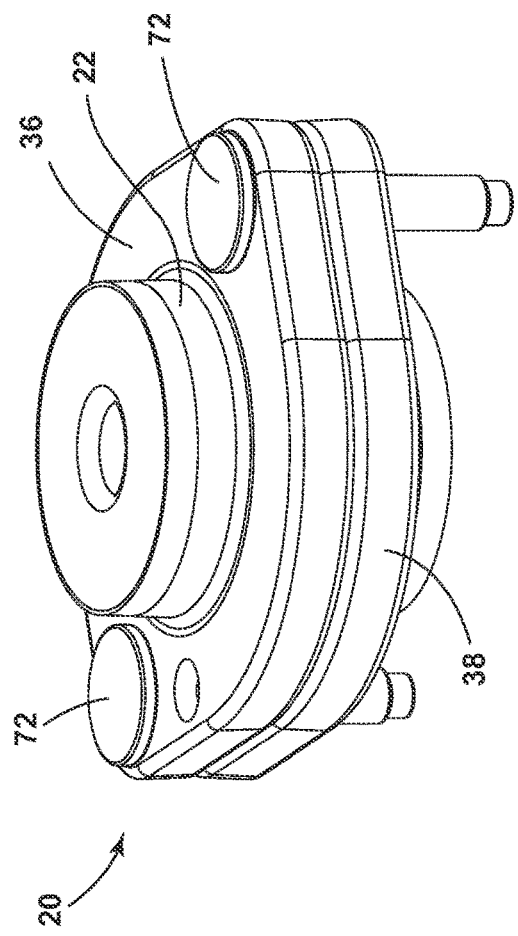
FIGS. 3A and 3B are perspective views generally illustrating embodiments of hydraulic mounts according to teachings of the present disclosure.
Figure 3B:
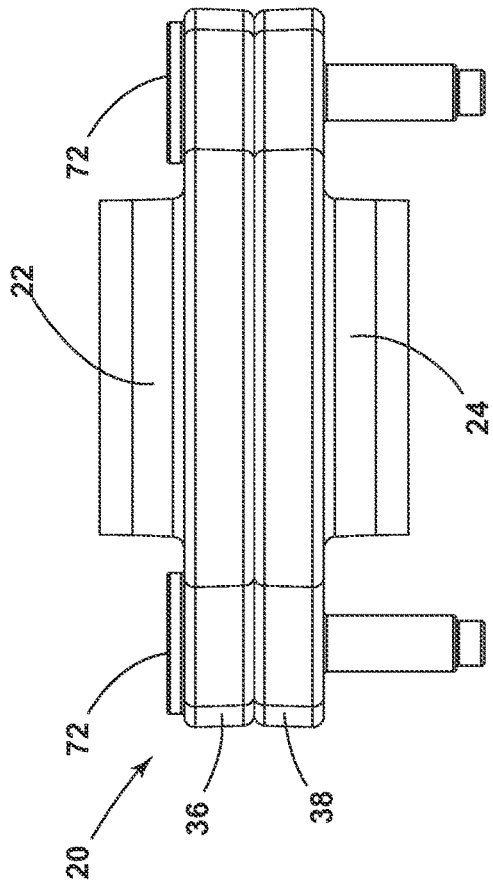
Figure 5B:
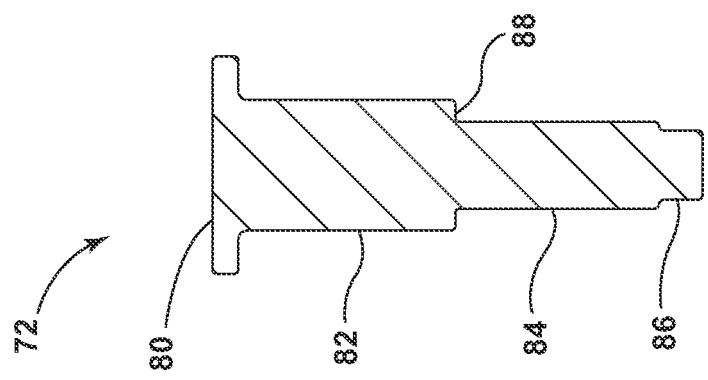
FIGS. 5A and 5B are perspective and cross-sectional views, respectively, generally illustrating embodiments of fasteners according to teachings of the present disclosure.
Figure 5A:
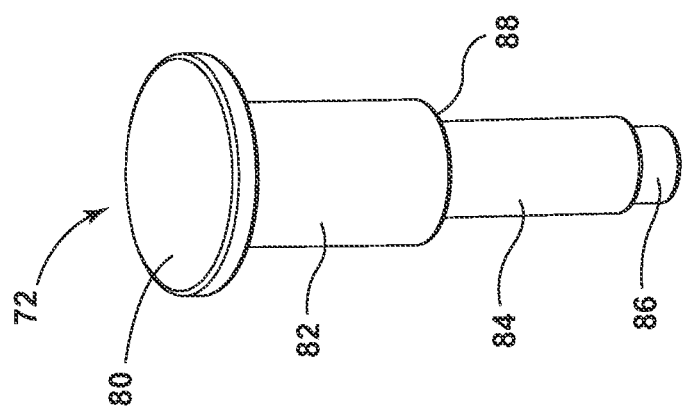

In embodiments, such as generally illustrated in FIG. 1, a mount 20 may include a housing 22, a first elastomeric member 24, a second elastomeric member 26, a third elastomeric member 28, a core 30, a first ring 32, and/or a second ring 34. The housing 22 may include a first housing member 36 and a second housing member 38. The first housing member 36 and the second housing member 38 may be configured to facilitate connection of the mount 20 with a first external component or structure 40 (e.g., a vehicle body). The core 30 may be configured to facilitate connection of the mount 20 with a second external component or structure 42 (e.g., a vehicle component, such as an engine). The mount 20 may be configured to restrict, dampen, and/or absorb relative movement between the first external component 40 and the second external component 42. The mount 20 may include an axis 20A (e.g., a central axis) that may extend in the Z-direction.

With embodiments, a first housing member 36 and a second housing member 38 may comprise one or more of a variety of shapes, sizes, configurations, and/or materials. The first housing member 36 and the second housing member 38 may be substantially identical. In embodiments, such as generally illustrated in FIGS. 2A and 2B, a housing member 36, 38 may include a body $50_1$, $50_2$ that may have a generally circular configuration. A first flange $52_1$, $52_2$ may extend from a first side of the housing member 36, 38 and a second flange $54_1$, $54_2$ may extend from a second side (e.g., an opposite side) of the body $50_1$, $50_2$. The flanges $52_1$, $52_2$, $54_1$, $54_2$ may provide the housing member 36, 38 with a generally oval-shaped appearance. The housing members 36, 38 may include a first channel $56_1$, $56_2$ and/or a second channel $58_1$, $58_2$. The first channel $56_1$, $56_2$ and/or the second channel $58_1$, $58_2$ may extend, generally, in a circumferential direction and/or may include generally C-shaped configurations that may open radially inward. The channels $56_1$, $56_2$, $58_1$, $58_2$ may be disposed at opposite sides of the housing members 36, 38 (e.g., opposite sides of axis 20A).

In embodiments, the first housing member 36 and the second housing member 38 may be disposed (e.g., assembled) in an opposing configuration such that the first channel $56_1$ of the first housing member 36 is aligned with and/or cooperates with the first channel $56_2$ of the second housing member 38 to provide the housing 22 with a first fluid passage 60 (see, e.g. FIG. 4B). Additionally or alternatively, in the opposing configuration, the second channel $58_1$ of the first housing member 36 may be aligned with and/or cooperate with the second channel $58_2$ of the second housing member 38 to provide the housing 22 with a second fluid passage 62.

In embodiments, the flanges $52_1$, $52_2$, $54_1$, $54_2$ of the housing members 36, 38 may include corresponding apertures $70_1$, $70_2$ that may be configured to receive respective fasteners 72. The fasteners 72 may extend through the apertures $70_1$, $70_2$ and into an external component (e.g., the first external component 40), such as to connect the mount 20 with the external component.

With embodiments, such as generally illustrated in FIGS. 3A, 3B, 4A, 4B, 5A, and 5B, a fastener 72 may include a head 80, a first body portion 82 that may extend from the head 80, a second body portion 84 that may extend from the first body portion 82, and/or a third body portion 86 that may extend from the second body portion 84. An outer diameter of the head 80 may be larger than an outer diameter of the first body portion 82, which may be larger than an outer diameter of the second body portion 84, which may be larger than an outer diameter of the third body portion 86. The first body portion 82 may include a circumferential recess 88 that may be disposed at an axial surface of the first body portion 82 and extend toward the head 80.

Figure 6A:
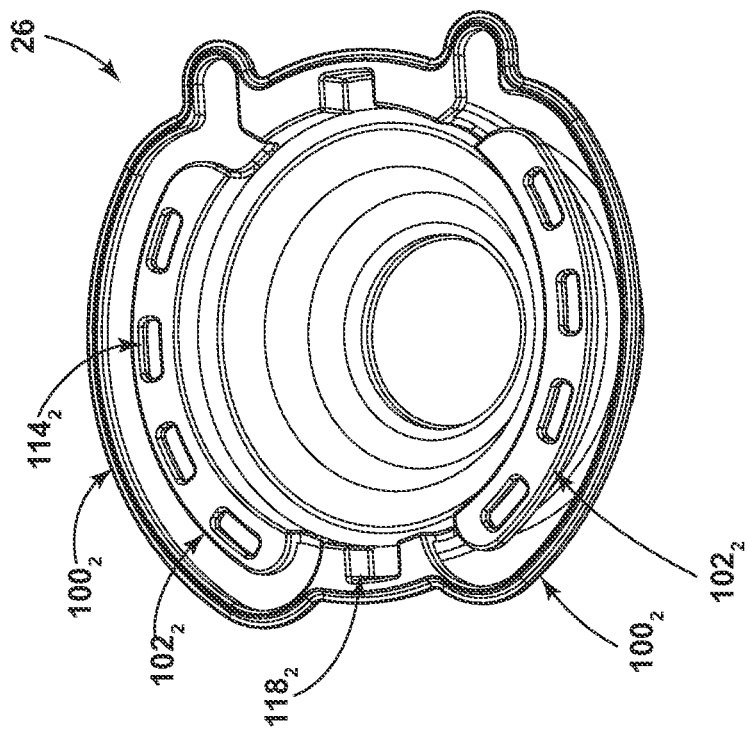
FIGS. 6A and 6B are perspective views generally illustrating embodiments of first and second elastomeric members according to teachings of the present disclosure.
Figure 6B:
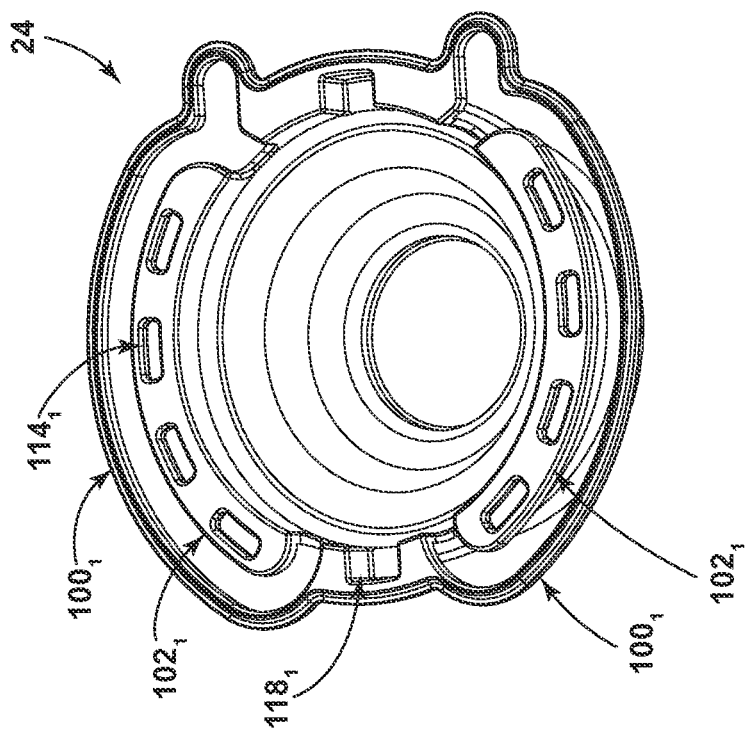
Figure 6C:
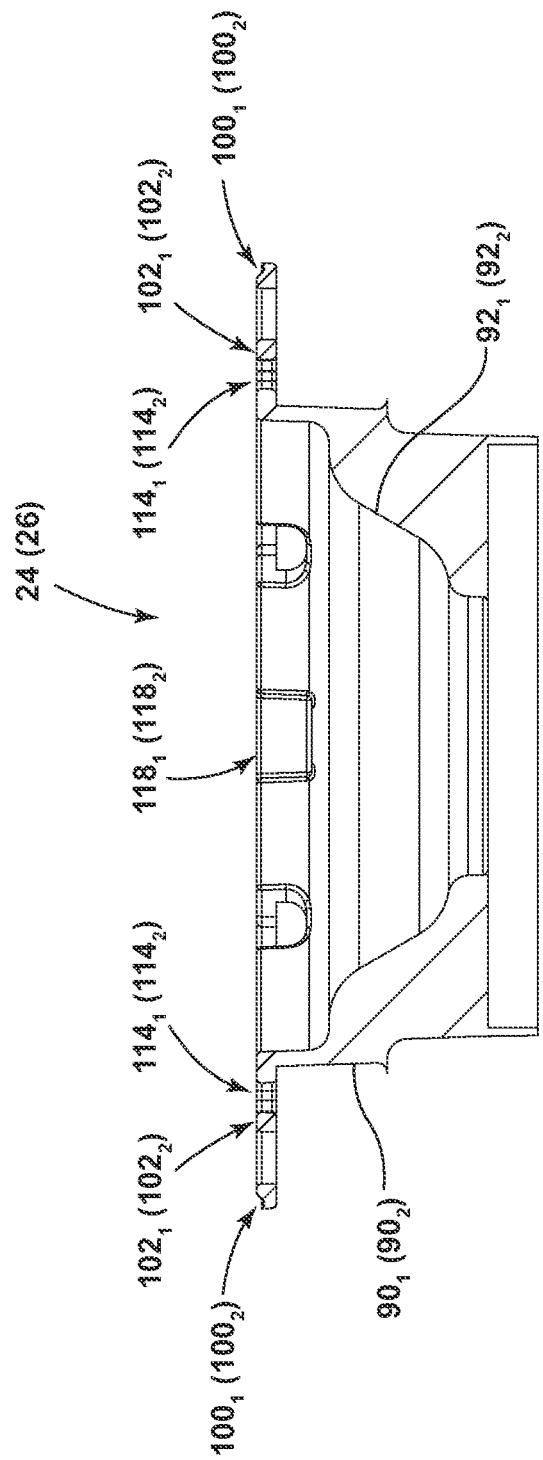
FIG. 6C is a cross-sectional view generally illustrating portions of an embodiment of a first elastomeric member or a second elastomeric member according to teachings of the present disclosure.
Figure 7:
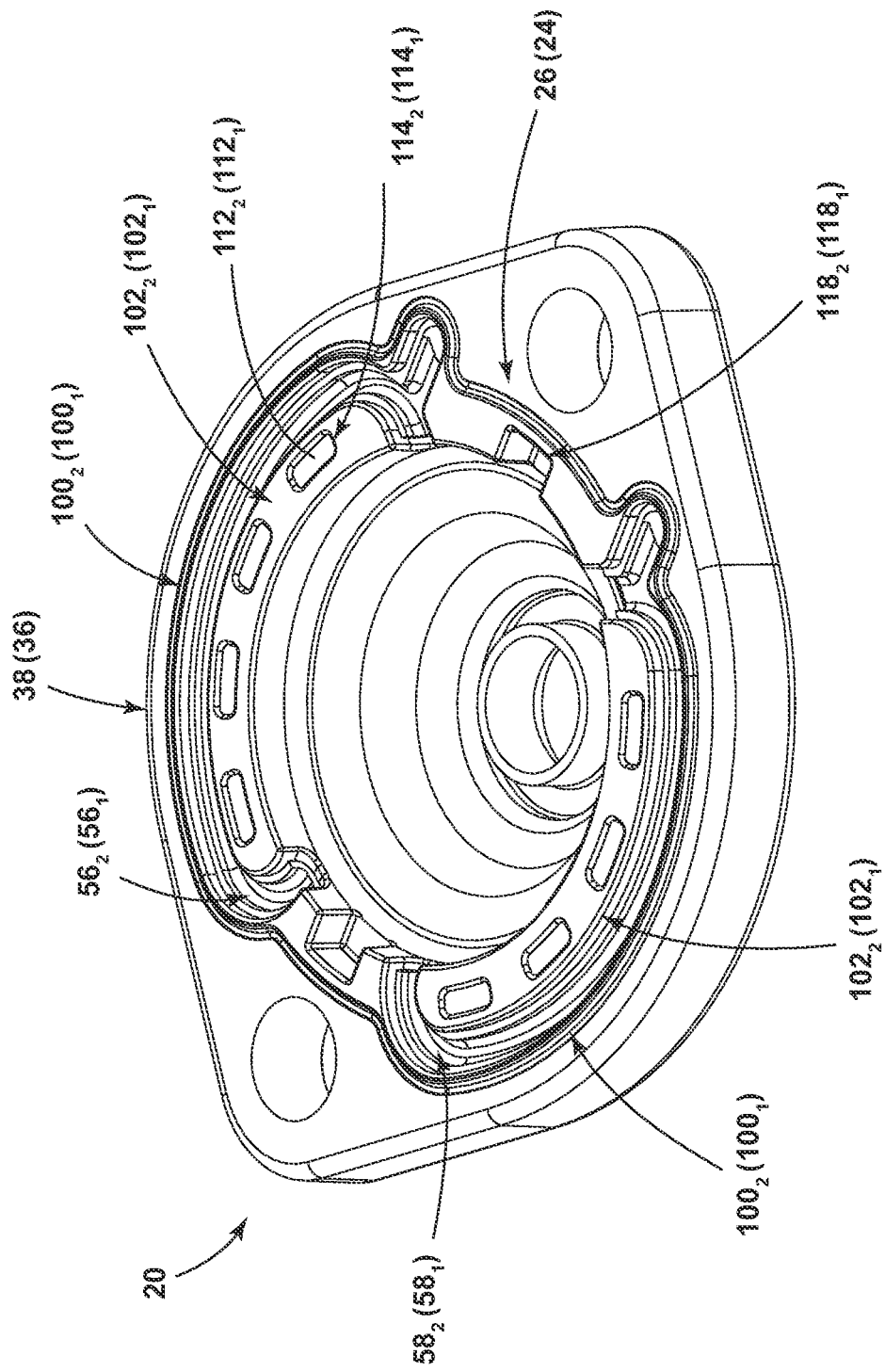
FIG. 7 is a perspective view generally illustrating portions of an embodiment of a hydraulic mount according to teachings of the present disclosure.

In embodiments, the first elastomeric member 24 and the second elastomeric member 26 may comprise one or more of a variety of shapes, sizes, configurations, and/or materials. As generally illustrated in FIGS. 6A and 6B, the elastomeric members 24, 26 may, for example and without limitation, include substantially identical configurations. The elastomeric members 24, 26 may include generally cylindrical outer surfaces $90_1$, $90_2$ and/or generally conical inner surfaces $92_1$, $92_2$ (see, e.g., FIG. 6C). The elastomeric members 24, 26 may include flanges that may have outer portions $100_1$, $100_2$ and/or inner portions $102_1$, $102_2$. The outer portions $100_1$, $100_2$ may be configured for at least partial insertion into the housing members 36, 38. The inner portions $102_1$, $102_2$ may include apertures $114_1$, $114_2$. The outer portions $100_1$, $100_2$ and the inner portions $102_1$, $102_2$ may be spaced (e.g., radially) such that, in an assembled configuration, the channels $56_1$, $56_2$, $58_1$, $58_2$ of the housing members 36, 38 may be disposed between (e.g., radially) the inner portions $102_1$, $102_2$ and the outer portions $100_1$, $100_2$. The inner portions $102_1$, $102_2$ and/or the outer portions $100_1$, $100_2$ may cooperate with the housing members 36, 38 to provide and/or seal the first fluid passage 60 and the second fluid passage 62.

With embodiments, the housing members 36, 38 may include recesses $110_1$, $110_2$ that may be configured to receive the outer portions $100_1$, $100_2$ of the first elastomeric member 24 and the second elastomeric member 26, respectively. Additionally or alternatively, the housing members 36, 38 may include protrusions $112_1$, $112_2$ that may be configured to extend into corresponding apertures or recesses $114_1$, $114_2$ of the inner portions $102_1$, $102_2$ of the elastomeric members 24, 26. The apertures $114_1$, $114_2$ and the protrusions $112_1$, $112_2$ may be configured to cooperate to restrict relative movement between the housing members 36, 38 and the elastomeric members 24, 26.

In embodiments, the housing members 36, 38 may include grooves $116_1$, $116_2$ that may be configured to receive projections $118_1$, $118_2$ of the elastomeric members 24, 26. The grooves $116_1$, $116_2$ and the projections $118_1$, $118_2$ may, for example and without limitation, include generally rectangular configurations, and may cooperate to restrict relative movement between the housing members 36, 38 and the elastomeric members 24, 26. The grooves $116_1$, $116_2$ may, for example, be disposed opposite each other and/or may be substantially aligned (e.g., in a radial direction) with the apertures $70_1$, $70_2$ of the housing members 36, 38.

In embodiments, a third elastomeric member 28 may comprise one or more of a variety of shapes, sizes, configurations, and/or materials. As generally illustrated in FIGS. 8A, 8B, and 8C, the third elastomeric member 28 may include a generally cylindrical configuration that may include a flange 120 that may be disposed at or about a middle portion of the third elastomeric member 28. The flange 120 may include a generally J-shaped configuration.

In embodiments, a core 30 may comprise one or more of a variety of shapes, sizes, configurations, and/or materials. As generally illustrated in FIGS. 9A, 9B, and 9C, the core 30 may include a generally cylindrical configuration that may be hollow (e.g., may include a tube-like configuration). The third elastomeric member 28 may be disposed and/or formed around an outer surface of the core 30. For example and without limitation, the third elastomeric member 28 may extend along an entire length and/or circumference of the core 30, and may extend beyond the core 30, such as in one or both axial directions (Z-directions). A first ferrule 122 may be connected to a first end of the core 30 and/or a second ferrule 124 may be connected to a second end of the core 30 (see, e.g., FIG. 4A). The first and second elastomeric members 24, 26 may be disposed substantially between (e.g., axially) the first ferrule 122 and the second ferrule 124. The ferrules 122, 124 may be pressed into the core 30, which may include deforming the first elastomeric member 24 and/or the second elastomeric member 26, at least to some degree.

Figure 10C:
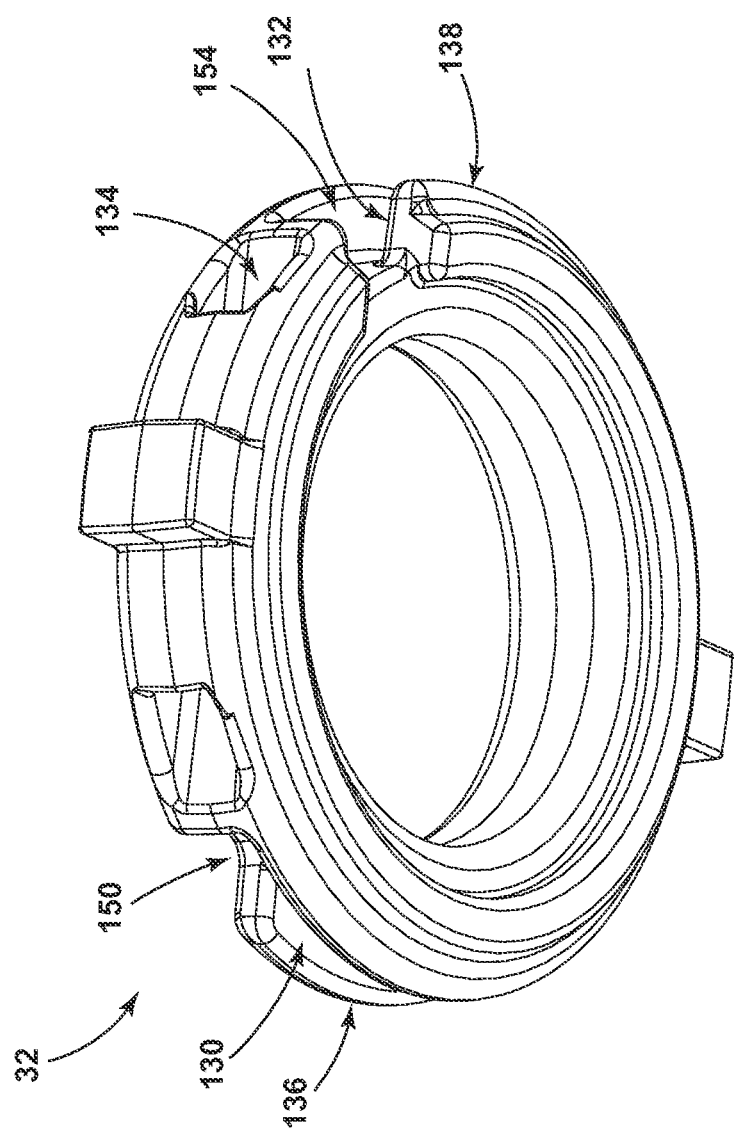
FIG. 10C is a perspective view generally illustrating portions of an embodiment of a first ring according to teachings of the present disclosure.

In embodiments, a first ring 32 may comprise one or more of a variety of shapes, sizes, configurations, and/or materials. As generally illustrated in FIGS. 10A, 10B, and 10C, embodiments of the first ring 32 may include a generally annular configuration. The first ring 32 may include a first fluid passage 130, a second fluid passage 132, and/or a third fluid passage 134. The first fluid passage 130 may be formed in a first radial surface 136 of the first ring 32. The second fluid passage 132 may be formed in a second radial surface 138 of the first ring 32. The first and second circumferential surfaces 136, 138 may be disposed opposite each other. The first and second fluid passages 130, 132 may open outward (e.g., radially) and may be closed, at least in some sections, via the first and/or second elastomeric members 24, 26. The first and second fluid passages 130, 132 may extend, generally, in a circumferential direction.

With embodiments, the first fluid passage 130 may include a first fluid port 150 and a second fluid port 152. The first fluid port 150 may extend/open generally in an axial direction (e.g., may be configured as an axial fluid port). The second fluid port 152 may extend/open generally in a radial direction (e.g., may be configured as a radial fluid port). The second fluid passage 132 may include a first fluid port 154 and a second fluid port 156. The first fluid port 154 may extend/open generally in an axial direction (e.g., may be configured as an axial fluid port). The second fluid port 156 may extend/open generally in a radial direction (e.g., may be configured as a radial fluid port). The first fluid passage 130 and the second fluid passage 132 may, for example and without limitation, include substantially identical configurations that may be disposed in opposite orientations (e.g., the first fluid port 150 of the first fluid passage 130 may open in a first axial direction and the first fluid port 154 of the second fluid passage 132 may open in a second, opposite axial direction).

In embodiments, a third fluid passage 134 may extend through the first ring 32. For example and without limitation, the third fluid passage 134 may extend substantially in a radial direction (e.g., in a Y-direction) and may be offset from an axis 20A of the mount 20 (e.g., may include a chord configuration). In an assembled configuration the third fluid passage 134 may provide fluid communication between the first fluid passage 60 of the housing 22 and the second fluid passage 62 of the housing 22, which may not otherwise be in fluid communication.

With embodiments, in an assembled configuration, portions of a first ring 32 (e.g., outer edges) may be disposed between (e.g., axially) the first housing member 36 and the second housing member 38, which may substantially prevent axial movement of the first ring 32 relative to the housing 22.

With embodiments, a second ring 34 may comprise one or more of a variety of shapes, sizes, configurations, and/or materials. Referring again to FIGS. 9A, 9B, and 9C, embodiments of the second ring 34 may include a generally annular configuration that may include a generally J-shaped cross-section that may correspond to the J-shaped cross-section of the flange 120 of the core 30. The second ring 34 may be disposed around and/or connected to the flange 120 of the core 30. The second ring 34 may connect the first ring 32 with the third elastomeric member 28. The J-shaped cross-sections of the flange 120 and the second ring 34 may restrict relative movement between (e.g., lock) the second ring 34 and the flange 120 of the third elastomeric member 28. The second ring 34 may be press/interference fit and/or swaged with the third elastomeric member 28. The second ring 34 may be configured to provide a 360 degree radially inward calibration of the third elastomeric member 28.

Referring again to FIGS. 1, 4A, and 4B, embodiments of a mount 20 may include a first fluid chamber 160 and/or a second fluid chamber 162. The first fluid chamber 160 may be provided and/or defined by the first elastomeric member 24, the third elastomeric member 28, the first ring 32, and/or the second ring 34. The second fluid chamber 162 may be provided and/or defined by the second elastomeric member 26, the third elastomeric member 28, the first ring 32, and/or the second ring 34. A fluid 164 may be disposed in the first fluid chamber 160 and/or the second fluid chamber 162 (e.g., the mount 20 may be a hydraulic mount). The fluid 164 may, for example and without limitation, include glycol. The fluid 164 may be substantially incompressible. Relative movement of the first external component 40 and the second external component 42 may be involve relative movement of the core 30 and the housing 22, which may be limited and/or controlled via the flow of fluid 164 between the first fluid chamber 160 and the second fluid chamber 162. For example and without limitation, movement of the core 30 may involve changing an internal volume of the first fluid chamber 160 and/or the second fluid chamber 162. As the fluid chambers 160, 162 may contain and/or be full of (substantially incompressible) fluid 164, changing the volumes of the fluid chambers 160, 162 may involve fluid 164 flowing between the fluid chambers 160, 162.

Figure 11:
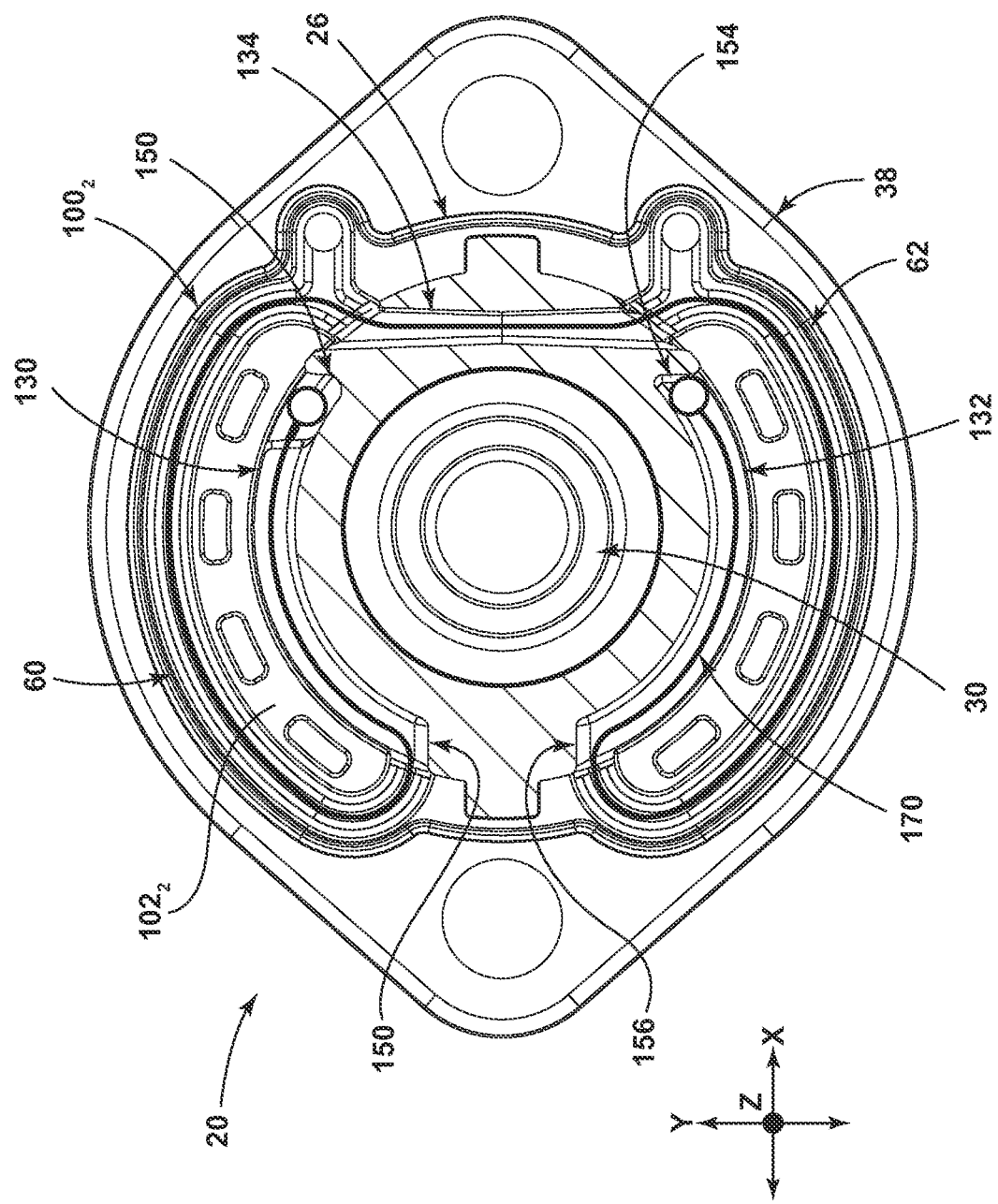
FIG. 11 is a cross-sectional view generally illustrating a flow path of an embodiment of a hydraulic mount according to teachings of the present disclosure
Figure 12:
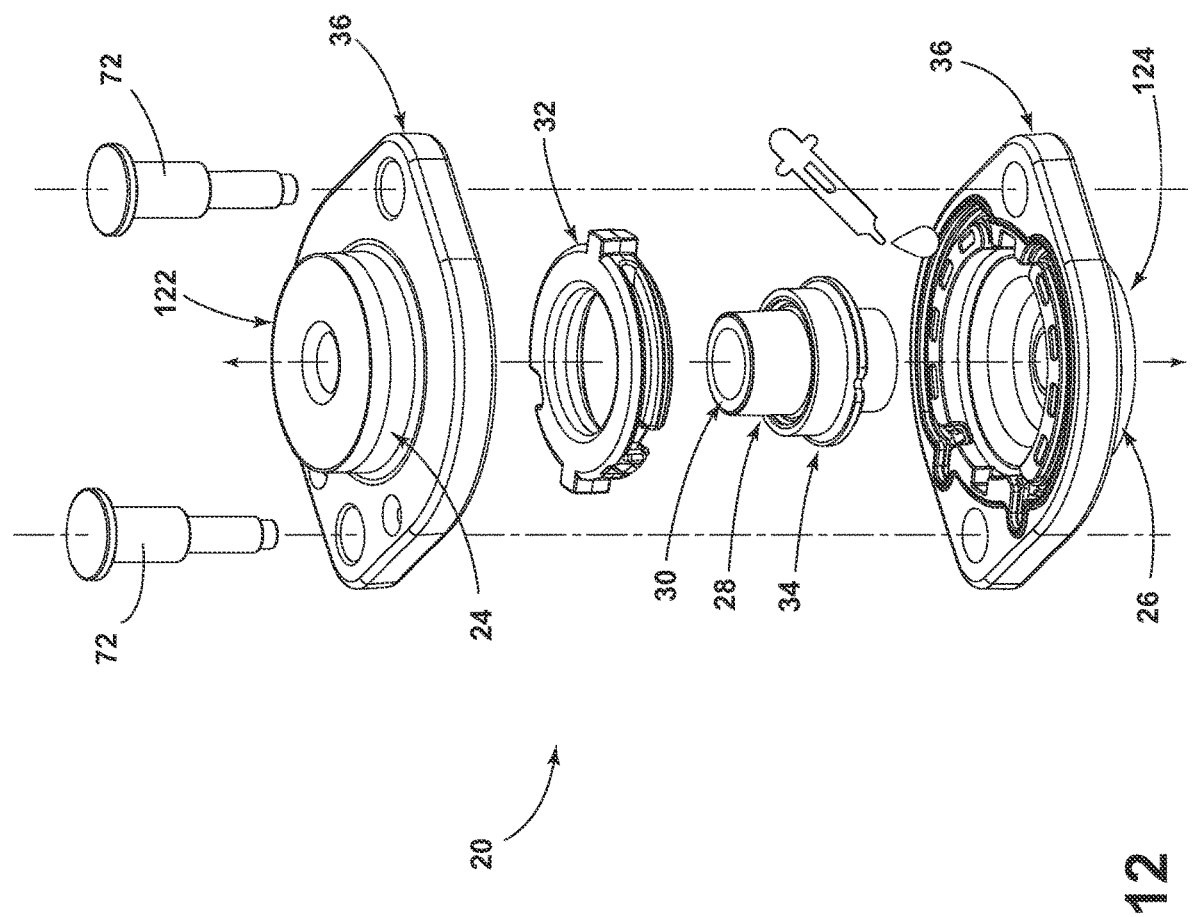
FIG. 12 is an exploded perspective view generally illustrating portions of an embodiment of a hydraulic mount according to teachings of the present disclosure.

In embodiments, fluid 164 may flow between the first fluid chamber 160 and the second fluid chamber 162 via a flow path 170. The flow path 170 may, for example and without limitation, be the only flow path between the first fluid chamber 160 and the second fluid chamber 162. With embodiments, the flow path 170 may be relatively circuitous and may include the first fluid passage 130 of the first ring 32, the first fluid passage 60 of the housing 22, the third fluid passage 134 of the first ring 32, the second fluid passage 62 of the housing 22, and the second fluid passage 62 of the housing 22 (see, e.g., FIG. 11). For example and without limitation, fluid 164 flowing from the first fluid chamber 160 to the second fluid chamber 162 may flow (i) from the first fluid chamber 160 into the first fluid port 150 of the first fluid passage 130 of the first ring 32 (e.g., in a first axial direction), (ii) through the first fluid passage 130 of the first ring 32, generally in a first circumferential direction, (iii) through the second fluid port 152 (e.g., in a radial direction) to the first fluid passage 60 of the housing 22, (iv) through the first fluid passage 60 of the housing 22, generally in a second circumferential direction, to the third fluid passage 134 of the first ring 32, (v) through the third fluid passage 134 of the first ring 32 to the second fluid passage 62 of the housing 22, (vi) through the second fluid passage 62 of the housing 22, generally in the second circumferential direction, (vii) into the second fluid port 156 of the second fluid passage 132 of the first ring 32 (e.g., in a generally radial direction), (viii) through the second fluid passage 132 of the first ring 32, generally in the first circumferential direction, and (ix) through the first fluid port 154 of the second fluid passage 132 (e.g., in a second axial direction) into the second fluid chamber 162. Fluid 164 flowing from the second fluid chamber 162 to the first fluid chamber 160 may flow in the opposite direction through the flow path 170. A circuitous flow path 170 may restrict fluid flow between the fluid chambers 160, 162, which may limit and/or damp relative movement between the housing 22 (and the first external component 40) and the core 30 (and the second external component 42).

Figure 13:
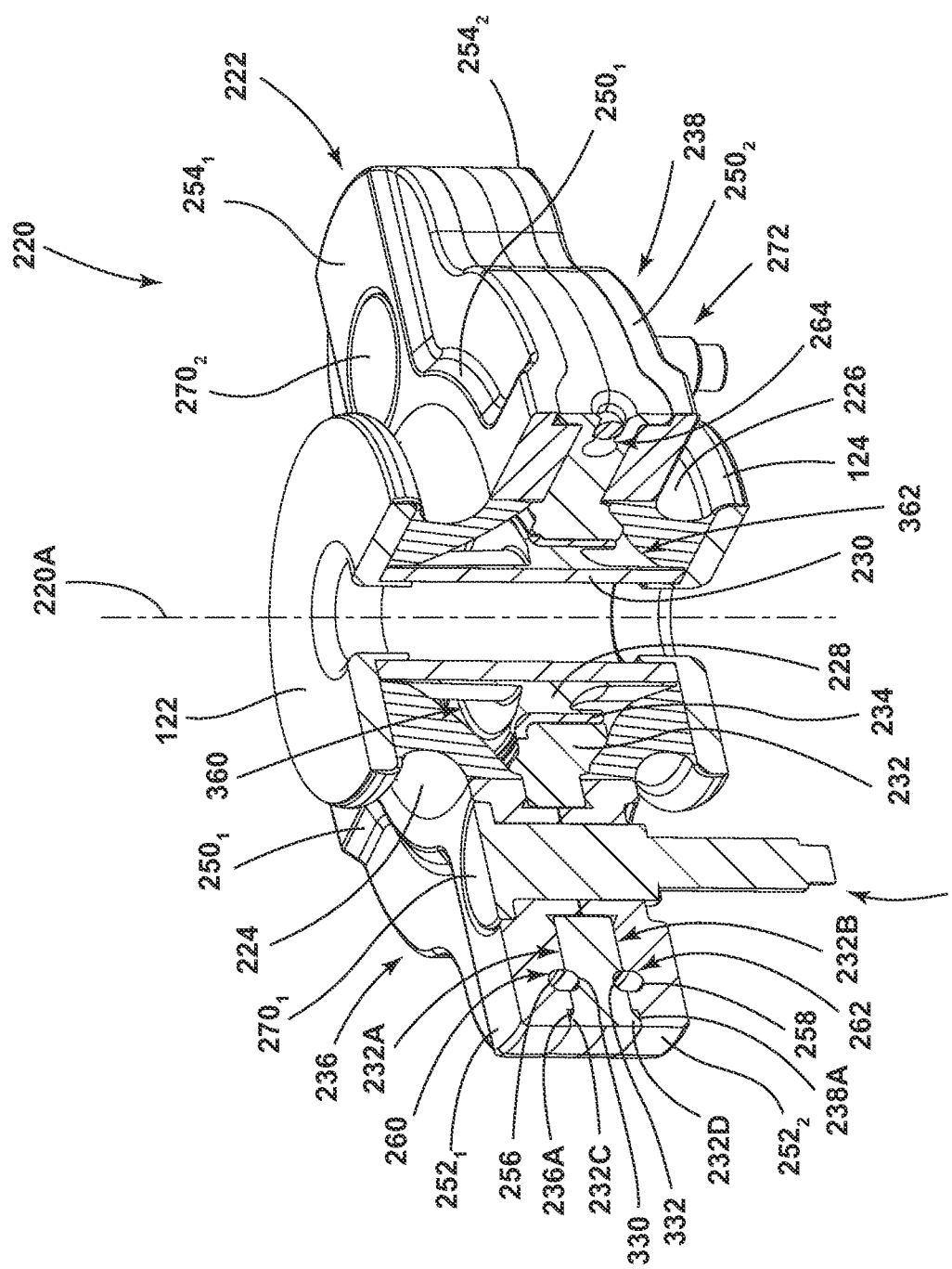
FIG. 13 is a cross-sectional perspective view generally illustrating portions of an embodiment of a hydraulic mount according to teachings of the present disclosure.

In embodiments, such as generally illustrated in FIGS. 13, 14A, and 14B, a mount 220 may be configured in a similar manner as the mount 20. For example and without limitation, the mount 220 may include a housing 222, a first elastomeric member 224, a second elastomeric member 226, a third elastomeric member 228, a core 230, a first ring 232, and/or a second ring 234. The housing 222 may include a first housing member 236 and a second housing member 238. The first housing member 236 and the second housing member 238 may be configured to facilitate connection of the mount 220 with a first external component or structure 40 (e.g., a vehicle body). The core 230 may be configured to facilitate connection of the mount 220 with a second external component or structure 42 (e.g., a vehicle component, such as an engine). The mount 20 may be configured to restrict, dampen, and/or absorb relative movement between the first external component 40 and the second external component 42. The mount 220 may include an axis 220A (e.g., a central axis) that may extend in the Z-direction.

With embodiments, a first housing member 236 and a second housing member 238 may comprise one or more of a variety of shapes, sizes, configurations, and/or materials. The first housing member 236 and the second housing member 238 may be substantially identical. In embodiments, such as generally illustrated in FIGS. 15A and 15B a housing member 236, 238 may include a body $250_1$, $250_2$ that may have a generally circular configuration. A first flange $252_1$, $252_2$ may extend from a first side/end of the housing member 236, 238 and a second flange $254_1$, $254_2$ may extend from a second side/end (e.g., an opposite side/end) of the body $250_1$, $250_2$. The flanges $252_1$, $252_2$, $254_1$, $254_2$ may provide the housing member 236, 238 with a generally oval-shaped appearance.

In embodiments, the flanges $252_1$, $252_2$, $254_1$, $254_2$ of the housing members 236, 238 may include corresponding apertures $270_1$, $270_2$ that may be configured to receive respective fasteners 272. The fasteners 72 may extend through the apertures $270_1$, $270_2$ and into an external component (e.g., the first external component 40), such as to connect the mount 220 with the external component.

With embodiments, the first housing member 236 may include a channel 256 and/or the second housing member 238 may include a channel 258. The channels 256, 258 may extend at or about an outer perimeter of the housing members 236, 238. The channels 256, 258 may, for example, extend along an outer perimeter of the first flange $252_1$, $252_2$, a first side of the body $250_1$, $250_2$, the second flange $254_1$, $254_2$, and/or at least partially along a second side of the body $250_1$, $250_2$.

Figure 17C:
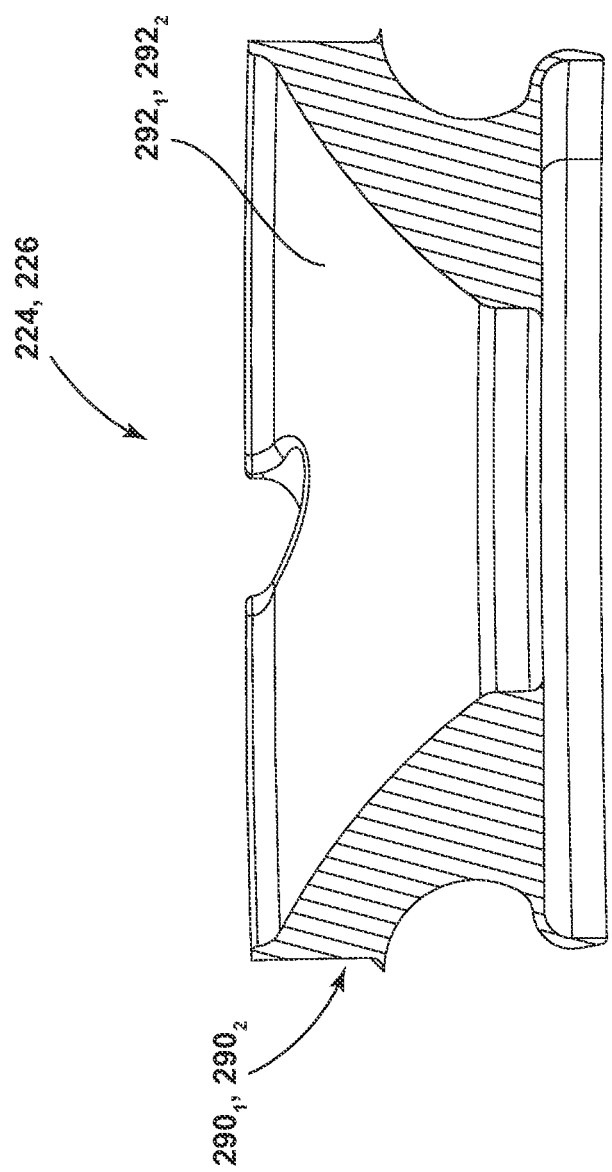
FIG. 17C is a cross-sectional view generally an embodiment of an elastomeric member according to teachings of the present disclosure.
Figure 18:
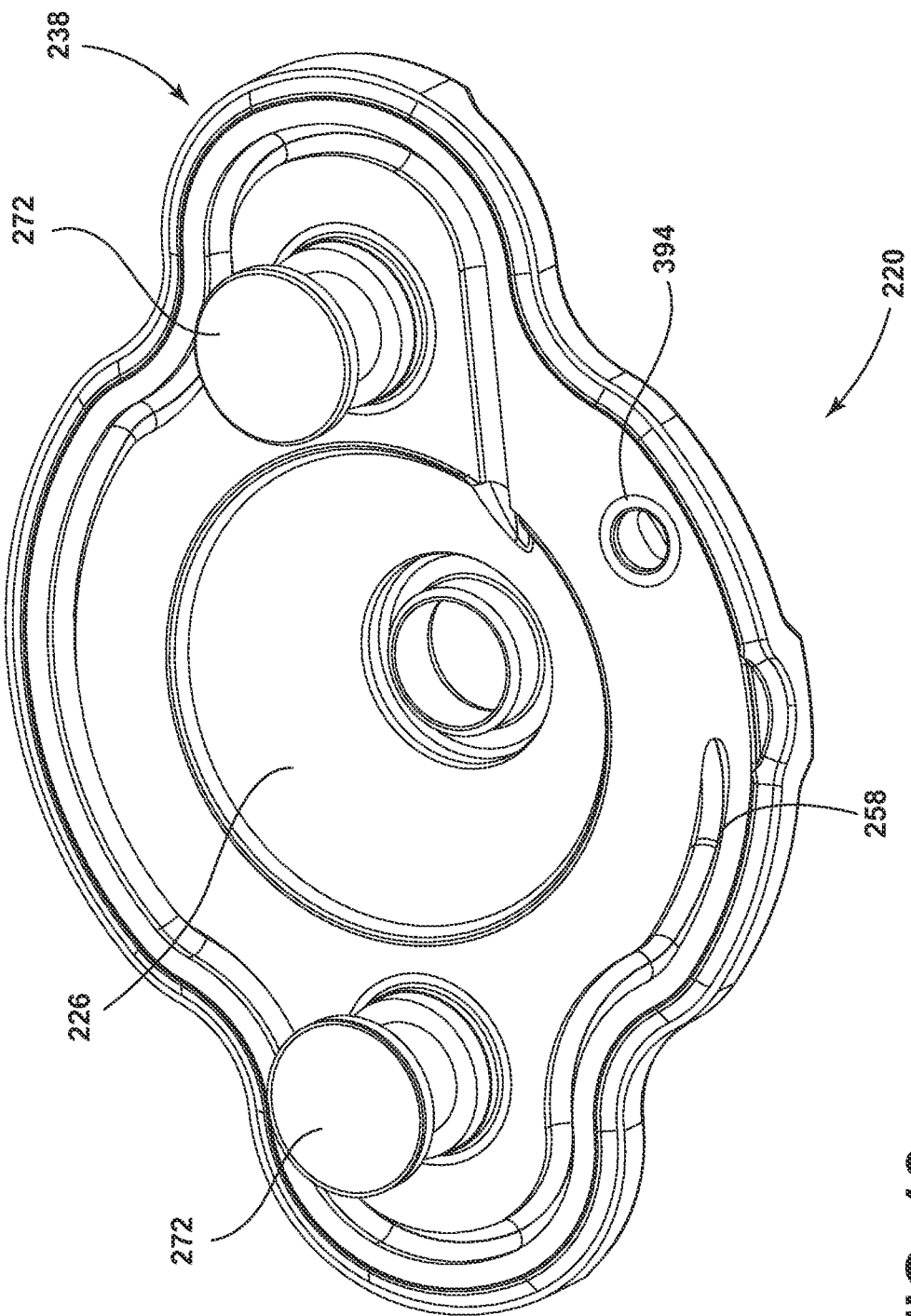
FIG. 18 is a perspective view generally illustrating portions of embodiment of a housing member and an elastomeric member according to teachings of the present disclosure.
Figure 19:
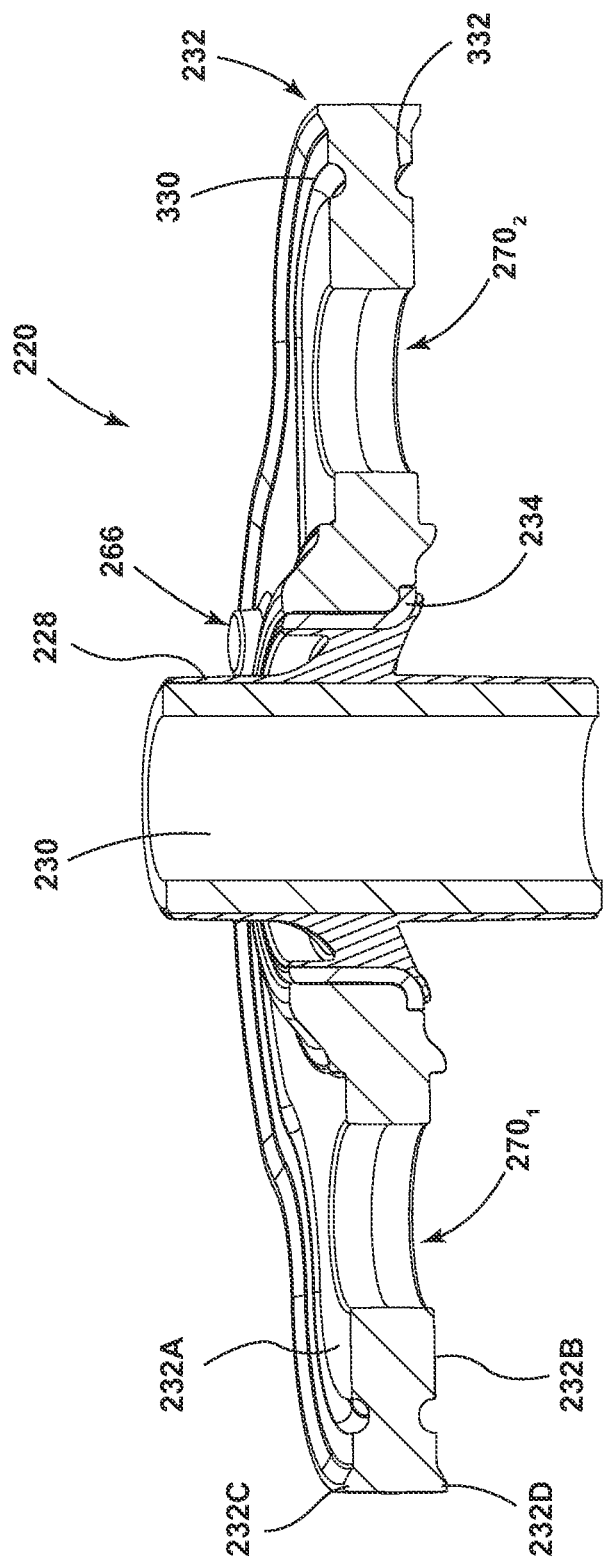
FIG. 19 is a cross-sectional view generally illustrating portions of an embodiment of a hydraulic mount according to teachings of the present disclosure.
Figure 21:
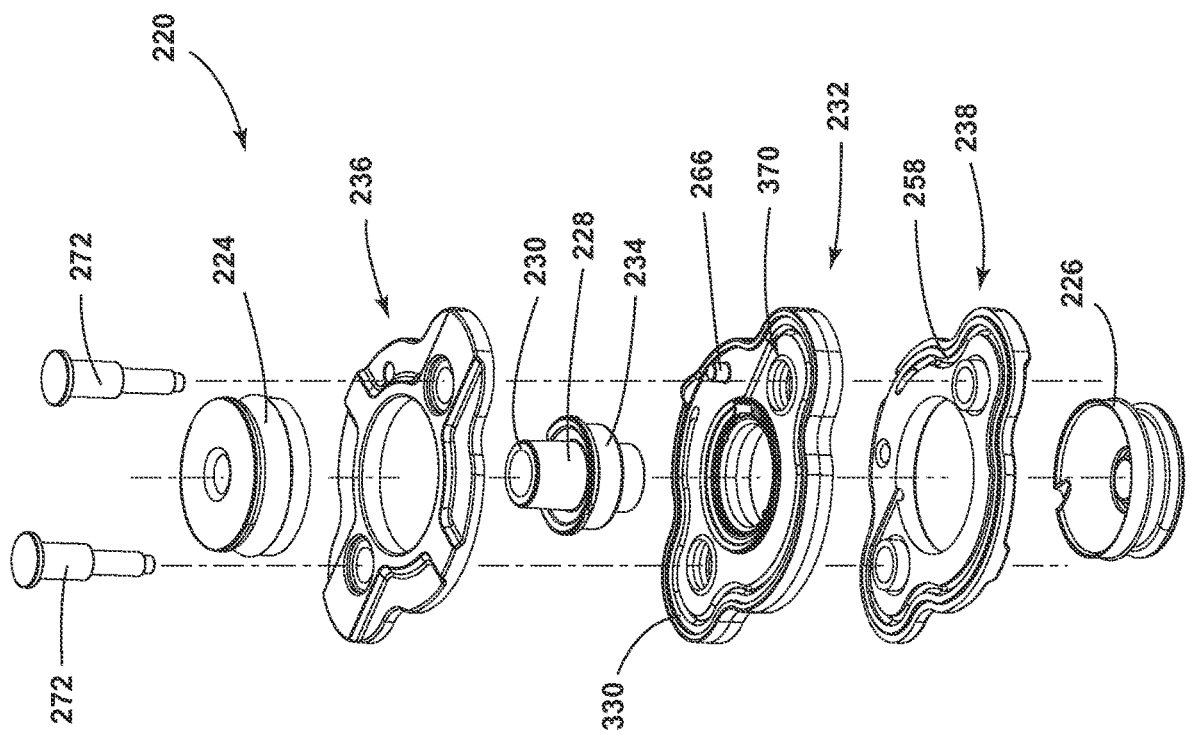
FIG. 21 is an exploded perspective view generally illustrating portions of an embodiment of a hydraulic mount according to teachings of the present disclosure.

In embodiments, the first elastomeric member 224 and the second elastomeric member 226 may comprise one or more of a variety of shapes, sizes, configurations, and/or materials. The elastomeric members 224, 226 may, for example and without limitation, include substantially identical configurations. As generally illustrated in FIGS. 17A, 17B, and 17C, the elastomeric members 224, 226 may include generally cylindrical outer surfaces $290_1$, $290_2$ and/or generally conical inner surfaces $292_1$, $292_2$. A third elastomeric member 228 may be configured in the same or a similar manner as the third elastomeric member 28. A core 230 may be configured in the same or a similar manner as the core 30 of mount 20. The core 230 and/or the third elastomeric member 228 may be configured for connection with one or more ferrules 122, 124, which may be configured to close the mount 220.

In embodiments, a first ring 232 may comprise one or more of a variety of shapes, sizes, configurations, and/or materials. As generally illustrated in FIGS. 19, 20A, 20B, 20C, and 20D, embodiments of the first ring 232 may include a shape that corresponds to the shape of the housing members 236, 238. The first ring 232 may include a first channel 330 that may be disposed in a first side 232A (e.g., a first axial side) of the first ring 232 and/or may include a second channel 332 that may be disposed in a second side 232B of the first ring 232 that may be opposite the first side 232B.

Figure 16C:
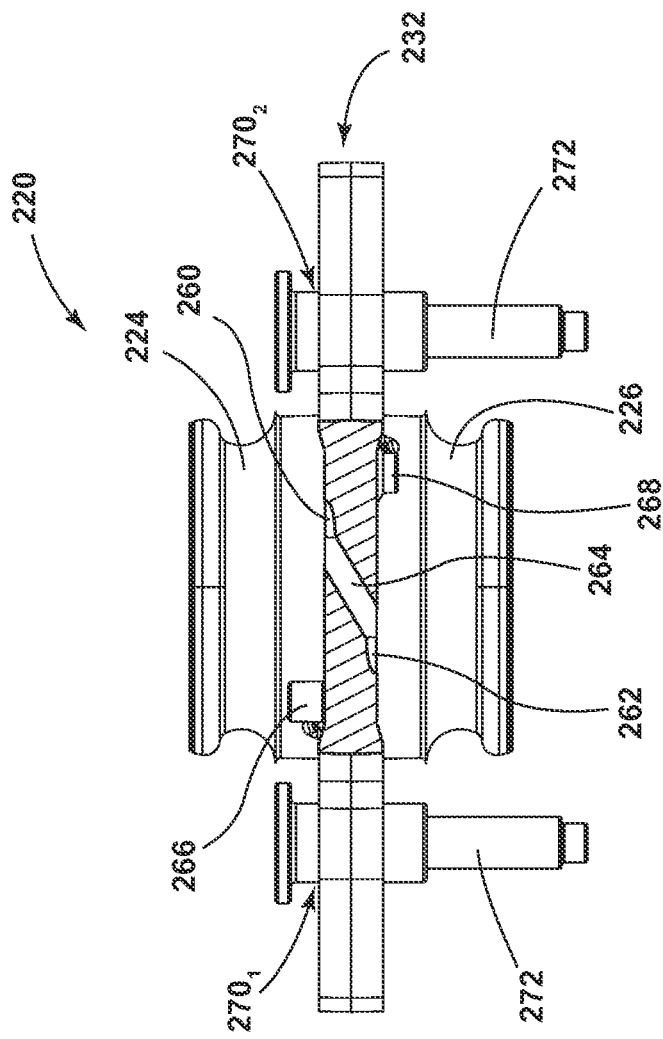
FIG. 16C is a cross-sectional perspective view generally illustrating portions of an embodiment of a hydraulic mount according to teachings of the present disclosure.

In embodiments, the first housing member 236 and the second housing member 238 may be disposed (e.g., assembled) in an opposing configuration on opposite sides of the first ring 232 such that the channel 256 of the first housing member 236 may be aligned with and/or cooperate with the channel 330 of the first ring 232 to provide the mount 220 with a first fluid passage 260 (see, e.g. FIGS. 16A, 16B, and 16C). Additionally or alternatively, in the opposing configuration, the channel 258 of the second housing member 238 may be aligned with and/or cooperate with the second channel 332 of the first ring 232 to provide the mount 220 with a second fluid passage 262.

With embodiments, such as generally illustrated in FIGS. 16C and 20D, the first ring 232 may include an internal fluid passage 264. The internal fluid passage 264 may provide fluid communication between the first fluid passage 260 and the second fluid passage 262. The internal fluid passage 264 may, for example and without limitation, extend through the first ring 232, such as from the first side 232A of the first ring 232 to the second side 232B, and may extend at an angle (e.g., an oblique angle) relative to the axial direction.

With embodiments, in an assembled configuration, portions of a first ring 232 (e.g., outer edges) may be disposed between (e.g., axially) the first housing member 236 and the second housing member 238, which may substantially prevent axial movement of the first ring 232 relative to the housing 222. The first ring 232 may include a protrusion 232C that may extend in a first axial direction from the first side 232A of the first ring 232 and/or may include a protrusion 232D that may extend in a second axial direction from the second side 232B of the first ring 232. The protrusions 232C, 232D may extend along the outer edge of the first ring 232 and may be configured to engage respective recesses 236A, 238A in the outer edges of the housing member 236, 238. Engagement of the protrusions 232C, 232D and the recesses 236A, 238A may limit relative movement (e.g., radial and/or circumferential/rotational movement) between the first ring 232 and the housing member 236, 238. The second ring 234 may be configured in the same or a similar manner as the second ring 34 of the mount 20.

Referring to FIGS. 13, 16A, and 16B, embodiments of a mount 220 may include a first fluid chamber 360 and/or a second fluid chamber 362. The first fluid chamber 360 may be provided and/or defined, at least in part, by the first elastomeric member 224, the third elastomeric member 228, the first ring 232, and/or the second ring 234. The first fluid passage 260 may be in fluid communication with the first fluid chamber 360. The second fluid chamber 362 may be provided and/or defined, at least in part, by the second elastomeric member 226, the third elastomeric member 228, the first ring 232, and/or the second ring 234. The second fluid passage 262 may be in fluid communication with the second fluid chamber 362. A fluid 364 may be disposed in the first fluid chamber 360 and/or the second fluid chamber 362 (e.g., the mount 220 may be a hydraulic mount). The fluid 364 may, for example and without limitation, include glycol. The fluid 364 may be substantially incompressible. Relative movement of the first external component 40 and the second external component 42 may be involve relative movement of the core 230 and the housing 222, which may be limited and/or controlled via the flow of fluid 364 between the first fluid chamber 360 and the second fluid chamber 362. For example and without limitation, movement of the core 230 may involve changing an internal volume of the first fluid chamber 160 and/or the second fluid chamber 162. As the fluid chambers 160, 162 may contain and/or be full of (substantially incompressible) fluid 364, changing the volumes of the fluid chambers 360, 362 may involve fluid 364 flowing between the fluid chambers 360, 362.

In embodiments, fluid 364 may flow between the first fluid chamber 360 and the second fluid chamber 362 via a flow path 370. The flow path 370 may, for example and without limitation, be the only flow path between the first fluid chamber 360 and the second fluid chamber 362. With embodiments, the flow path 370 may be relatively circuitous and may include the first fluid chamber 360, the first fluid passage 260, the internal fluid passage 264, the second fluid passage 262, and/or the second fluid chamber 362. For example and without limitation, fluid 364 flowing from the first fluid chamber 360 to the second fluid chamber 362 may flow (i) from the first fluid chamber 160 into the first fluid passage 260 of the first ring 232 (e.g., in an axial direction), (ii) through the first fluid passage 260 of the housing 222, generally in a circumferential direction, which may include flowing generally around the outside of the aperture $270_1$, (iii) through the internal fluid passage 264 of the first ring 232 (e.g., at an oblique angle to the axial direction) to the second fluid passage 262 of the housing 222, (iv) through the second fluid passage 262, generally in a circumferential direction, which may include flowing generally around the outside of the aperture $270_2$, and (ix) into the second fluid chamber 362 (e.g., in an axial direction). Fluid 164 flowing from the second fluid chamber 362 to the first fluid chamber 360 may flow in the opposite direction through the flow path 370. A circuitous flow path 370 may restrict fluid flow between the fluid chambers 360, 362, which may limit and/or damp relative movement between the housing 222 (and the first external component 40) and the core 230 (and the second external component 42).

In embodiments, fluid 364 flowing between the first fluid chamber 360 and the second fluid chamber 362 may, for example and without limitation, flow around the outer perimeter of the housing 222 about two times (e.g., once via the first fluid passage 260 and once via the second fluid passage 262). At least a portion of the first fluid passage 260 may be disposed radially outward of the first aperture $270_1$ and/or at least another portion of the first fluid passage 260 may be disposed radially outward of the second aperture $270_2$. Additionally or alternatively, at least a portion of the second fluid passage 262 may be disposed radially outward of the first aperture $270_1$ and/or at least another portion of the second fluid passage 262 may be disposed radially outward of the second aperture $270_2$.

In embodiments, such as generally illustrated in FIGS. 15A, 15B, 16A, 16B, and 16C, a mount 220 may include one or more sealing members, such as a first sealing member 380, a second sealing member 382, a third sealing member 384, a fourth sealing member 386, a fifth sealing member 388, a sixth sealing member 390, a seventh sealing member 392, and/or an eighth sealing member 394. The first sealing member 380 may be configured to provide a fluid seal between the first housing member 236 and the first ring 232, such as at or about an outer perimeter of the first ring 232 and/or the first housing member 236. The first sealing member 380 may be disposed at least partially radially outside the first fluid passage 260. The second sealing member 382 may be configured to provide a fluid seal between the second housing member 238 and the first ring 232, such as at or about an outer perimeter of the first ring 232 and/or the second housing member 238. The second sealing member 382 may be disposed at least partially radially outside the second fluid passage 262. The third sealing member 384 may be configured to provide a fluid seal around or about the first aperture $270_1$, such as between the first ring 232 and the first housing member 236. The fourth sealing member 386 may be configured to provide a fluid seal around or about the first aperture $270_1$, such as between the first ring 232 and the second housing member 238. The fifth sealing member 388 may be configured to provide a fluid seal around or about the second aperture $270_2$, such as between the first ring 232 and the first housing member 236. The sixth sealing member 390 may be configured to provide a fluid seal around or about the second aperture $270_2$, such as between the first ring 232 and the second housing member 238. The seventh sealing member 392 may be configured to provide a fluid seal around or about a first protrusion 266 of the first ring 232, such as between the first ring 232 and the first housing member 236. The eighth sealing member 394 may be configured to provide a fluid seal around or about a second protrusion 268 of the first ring 232 such as between the first ring 232 and the second housing member 238.

In embodiments, one or more sealing members (e.g., sealing members 380, 382, 384, 386, 388, 390, 392, 394) may be formed (e.g., directly) on the mount 220. For example and without limitation, one or more sealing members may be formed directly and/or automatically on the surface of the first ring 232, the first housing member 236, and/or the second housing member 238, such as via an automated machine/robot configured to automatically (e.g., without additional human intervention) deposit/apply sealing material.

In embodiments, a mount 220 may include a first elastomeric member 224, a second elastomeric member 226, a third elastomeric member 228, a housing 222, a first ring 232, a second ring 234, and/or a core 230. A method of making a mount 220 may include forming the third elastomeric member 228 around the core 230; connecting the second ring 234 with the third elastomeric member 228 and/or the core 230; connecting the first ring 232 with the third elastomeric member 228 and/or the core 230 via the second ring 234; connecting the first elastomeric member 224 with a first housing member 236 of the housing 222; connecting the second elastomeric member 226 with a second housing member 238 of the housing 222; connecting the first housing member 236 with the second housing member 238; filling at least one of a first fluid chamber 360 and a second fluid chamber 362 of the mount 220 with a fluid 364; and/or closing the mount 220 to at least substantially prevent the fluid 364 from exiting the mount 220. Closing the mount 220 may, for example and without limitation, include connecting ferrules 122, 124 to the core 230, the first elastomeric member 224, the second elastomeric member 226, and/or the third elastomeric member 228.

With embodiments, making a mount 220 may include forming a channel 256 in the first housing member 236; forming a channel 258 in the second housing member 238; forming a first channel 330 in a first side 232A of the first ring 232 configured to align with the channel 256 of the first housing member 236 to form a first fluid passage 260; forming a second channel 332 in a second side 232B of the first ring 232 configured to align with the channel 330 of the second housing member 238 to form a second fluid passage 262; and/or forming an internal fluid passage 264 in the first ring 232 configured to provide fluid communication between the first fluid passage 260 and the second fluid passage 262. Connecting the first housing member 236 with the second housing member 238 includes connecting the first housing member 236 and the second housing member 238 with the first ring 232. Connecting the first housing member 236 and the second housing member 238 with the first ring 232 may include (i) forming a first fluid passage 260 with the first housing member 236 and the first ring 232 and/or (ii) forming a second fluid passage 262 with the second housing member 238 and the first ring 232. An internal fluid passage 264 of the first ring 232 may provide fluid communication between the first fluid passage 260 and the second fluid passage 262. Making a mount 220 may include, for example, forming, automatically, a plurality of sealing members directly on the first ring 232.

In embodiments, a method of operating a mount 220 may include connecting the mount 220 to a first component 40; connecting the mount 220 to a second component 42; and/or damping, via the mount 220, relative movement between the first component 40 and the second component 42. Damping relative movement may include fluid 364 flowing in a flow path 370 between a first fluid chamber 360 and a second fluid chamber 362 of the mount 220. The first fluid chamber 360 may be provided, at least in part, by the first elastomeric member 224, the housing 222, the first ring 232, the second ring 234, the third elastomeric member 228, and/or the core 230. The second fluid chamber 362 may be provided, at least in part, by the second elastomeric member 226, the housing 222, the first ring 232, the second ring 234, the third elastomeric member 228, and/or the core 230. The flow path 370 may include a first fluid passage 260 that may extend along an outer perimeter of a first housing member 236 of the housing 222 and an outer perimeter of a first side 232A of the first ring 232. The fluid path 370 may include a second fluid passage 262 that may extend along an outer perimeter of a second housing member 238 of the housing 222 and an outer perimeter of a second side 232B of the second ring 232. The fluid path 370 may include an internal fluid passage 264 of the first ring 232 that may extend at an oblique angle relative to an axial direction.

With embodiments, a mount 20, 220 may be configured as a body mount, a subframe mount, a top mount, and/or an engine mount, among various other configurations.

In embodiments, the weight of an assembled mount 20, 220 may, for example and without limitation, be about 0.6 kg. Other mounts may include weights of about 2 kg. A volumetric damping efficiency ($N*s/cm^4$ or $kg/s*cm^3$) of a mount may correspond to peak damping ($N*s/cm$) divided by a total volume of the mount ($cm^3$). At 1 mm p-p, embodiments of a mount 20, 220 may, for example and without limitation, provide a volumetric efficiency of about 0.8 to about 0.85. Other mounts may include maximum volumetric damping efficiencies of about 0.5 to about 0.6 (e.g., embodiments of mounts 20, 220 may provide about a 40% improvement in volumetric damping efficiency).

In embodiments, one or more components of a mount 20, 220 may be formed as single, unitary components (e.g., may be monolithic). For example and without limitation, a first elastomeric member 24, 224, a second elastomeric member 26, 226, a third elastomeric member 28, 228, and/or a first ring 32, 232 may each be formed as monolithic components.

With embodiments, components of a mount 20, 220 may comprise one or more of a variety of materials. For example and without limitation, a first elastomeric member 24, 224, a second elastomeric member 26, 226, and/or a third elastomeric member 28, 228 may comprise one or more resilient materials, such as rubber. Additionally or alternatively, in embodiments, a housing 22, 222, a first ring 32, 232, and/or a second ring 34, 234 may include relatively rigid materials, such as one or more plastics and/or metals.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples," "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples," "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

What is claimed is:

1. A hydraulic mount, comprising:
   a core;
   a first elastomeric member;
   a second elastomeric member connected to the first elastomeric member;
   a third elastomeric member connected to the core;
   a housing including a first housing member connected to the first elastomeric member and a second housing member connected to the second elastomeric member;
   a first ring; and
   a second ring connecting the first ring with the third elastomeric member;
   wherein the first elastomeric member, the second elastomeric member, the third elastomeric member, the first ring, and the second ring cooperate to provide a first fluid chamber and a second fluid chamber; a fluid path connects the first fluid chamber to the second fluid chamber; and the fluid path extends from the first fluid chamber to a first fluid passage provided by the first ring and the first housing member, through an internal fluid passage of the first ring, to a second fluid passage provided by the first ring and the second housing member, and to the second fluid chamber.

2. The hydraulic mount of claim 1, wherein the fluid path extends from the first fluid chamber to the first ring, from the first ring to the housing, from the housing to the first ring, from the first ring to the housing, from the housing to the first ring, and from the first ring to the second fluid chamber.

3. The hydraulic mount of claim 1, wherein the first ring includes at least a portion of a first fluid passage, a second fluid passage, and a third fluid passage.

4. The hydraulic mount of claim 3, wherein the first fluid passage of the first ring includes an axial port connected to the first fluid chamber and a radial port connected to a first fluid passage of the housing.

5. The hydraulic mount of claim 4, wherein the second fluid passage of the first ring includes an axial port connected to the second fluid chamber and a radial port connected to a second fluid passage of the housing.

6. The hydraulic mount of claim 3, wherein the third fluid passage of the first ring includes a chord configuration.

7. The hydraulic mount of claim 1, wherein the fluid path extends from the first fluid chamber, along a perimeter of a first side of the first ring, through an internal fluid passage of the first ring, along a perimeter of a second side of the first ring, and to the second fluid chamber.

8. The hydraulic mount of claim 1, wherein an aperture extends through the first housing member, the first ring, and the second housing member.

9. The hydraulic mount of claim 8, wherein the aperture is configured to receive a fastener; and a portion of the fluid path is disposed radially outward of the aperture.

10. The hydraulic mount of claim 8, wherein a second aperture extends through the first housing member, the first ring and the second housing member; the second aperture is configured to receive a second fastener; and a second portion of the fluid path is disposed radially outward of the second aperture.

11. The hydraulic mount of claim 1, wherein the first housing member, the second housing member, and the first ring include substantially the same shape.

12. A hydraulic mount, comprising:
    a core;
    a first elastomeric member;
    a second elastomeric member connected to the first elastomeric member;
    a third elastomeric member connected to the core;
    a housing including a first housing member connected to the first elastomeric member and a second housing member connected to the second elastomeric member;
    a first ring; and
    a second ring connecting the first ring with the third elastomeric member;
    wherein the first elastomeric member, the second elastomeric member, the third elastomeric member, the first ring, and the second ring cooperate to provide a first fluid chamber and a second fluid chamber; a fluid path connects the first fluid chamber to the second fluid chamber; wherein the first housing member and the first ring provide a first fluid passage; the second housing member and the first ring provide a second fluid passage; and the first ring includes an internal fluid passage providing fluid communication between the first fluid passage and the second fluid passage.

13. A method of making a hydraulic mount having a first elastomeric member, a second elastomeric member, a third elastomeric member, a housing, a first ring, a second ring, and a core, the method comprising:
forming the third elastomeric member around the core;
connecting the second ring with the third elastomeric member;
connecting the first ring with the third elastomeric member via the second ring;
connecting the first elastomeric member with a first housing member of the housing;
connecting the second elastomeric member with a second housing member of the housing;
connecting the first housing member with the second housing member;
filling at least one of a first fluid chamber and a second fluid chamber of the hydraulic mount with a fluid; and
closing the mount to substantially prevent the fluid from exiting the mount;
wherein connecting the first housing member with the second housing member includes connecting the first housing member and the second housing member with the first ring.

14. The method of claim 13, including forming a channel in the first housing member; forming a channel in the second housing member; forming a first channel in a first side of the first ring configured to align with the channel of the first housing member to form a first fluid passage; forming a second channel in a second side of the first ring configured to align with the channel of the second housing member to form a second fluid passage; and forming an internal fluid passage in the first ring configured to provide fluid communication between the first fluid passage and the second fluid passage.

15. The method of claim 13, wherein connecting the first housing member and the second housing member with the first ring includes (i) forming a first fluid passage with the first housing member and the first ring and (ii) forming a second fluid passage with the second housing member and the first ring; and, an internal fluid passage of the first ring provides fluid communication between the first fluid passage and the second fluid passage.

16. The method of claim 13, including forming, automatically, a plurality of sealing members directly on the first ring.

* * * * *